US009379918B1

(12) United States Patent
Milbar

(10) Patent No.: US 9,379,918 B1
(45) Date of Patent: Jun. 28, 2016

(54) SYSTEM AND METHOD FOR INCREASING THROUGHPUT IN DIGITAL RADIO BROADCAST RECEIVER

(71) Applicant: iBiquity Digital Corporation, Columbia, MD (US)

(72) Inventor: Marek Milbar, Huntingdon Valley, PA (US)

(73) Assignee: iBiquity Digital Corporation, Columbia, MD (US)

( * ) Notice: Subject to any disclaimer, the term of this patent is extended or adjusted under 35 U.S.C. 154(b) by 0 days.

(21) Appl. No.: 14/612,882

(22) Filed: Feb. 3, 2015

(51) Int. Cl.
| | |
|---|---|
| H03K 9/00 | (2006.01) |
| H04L 27/00 | (2006.01) |
| H04L 25/02 | (2006.01) |
| H04H 20/33 | (2008.01) |
| H04L 5/00 | (2006.01) |
| H04L 27/22 | (2006.01) |
| H04B 1/12 | (2006.01) |

(52) U.S. Cl.
CPC ............ *H04L 25/0228* (2013.01); *H04B 1/126* (2013.01); *H04H 20/33* (2013.01); *H04L 5/0048* (2013.01); *H04L 27/22* (2013.01)

(58) Field of Classification Search
CPC .. H04B 7/0805; H04B 1/126; H04L 25/0232; H04L 27/261; H04L 27/22; H04L 5/0048; H04H 20/33
USPC ............................ 375/260, 267, 295, 16, 324
See application file for complete search history.

(56) References Cited

U.S. PATENT DOCUMENTS

| 7,724,850 B2 | 5/2010 | Kroeger et al. | |
| 2009/0128323 A1* | 5/2009 | Milbar | G08B 27/008 340/539.1 |
| 2012/0028567 A1* | 2/2012 | Marko | H04W 4/20 455/3.02 |
| 2012/0162512 A1* | 6/2012 | Johnson | H04H 20/30 348/515 |
| 2013/0070877 A1* | 3/2013 | Wang | H04H 20/30 375/340 |

FOREIGN PATENT DOCUMENTS

EP  2533453 A2  12/2012

OTHER PUBLICATIONS

International Search Report and Written Opinion for PCT Application No. PCT/US2016/016122, mailed Apr. 26, 2016.
ETSI, Digital Video Broadcasting (DVB), Implementation Guidelines for a second generation digital cable transmission system (DVB-C2), Technical Specification, ETSI TS 102 991 v1.2.1 (Jun. 2011).

\* cited by examiner

*Primary Examiner* — Freshten N Aghdam
(74) *Attorney, Agent, or Firm* — Terrile, Cannatti, Chambers & Holland, LLP; Michael Rocco Cannatti

(57) ABSTRACT

Enhanced digital broad cast signals are transmitted on a digital radio broadcast signal by allocating spectral resources of the digital radio broadcast signal to simultaneously serve existing receivers (which can decode default content but not new content from the enhanced digital broadcast signal) and new receivers (which can decode default content and can decode new digital content from the enhanced digital broadcast signal) by modulating a first plurality of reference subcarriers with a first signal constellation, and modulating a second plurality of reference subcarriers with a second modified signal constellation such that a receiver processes the digital radio broadcast signal to produce a first coherent reference signal estimate for the first plurality of reference subcarriers to extract the default content for playback and to produce a second coherent reference signal estimate for the second plurality of reference subcarriers to disregard the new content.

29 Claims, 16 Drawing Sheets

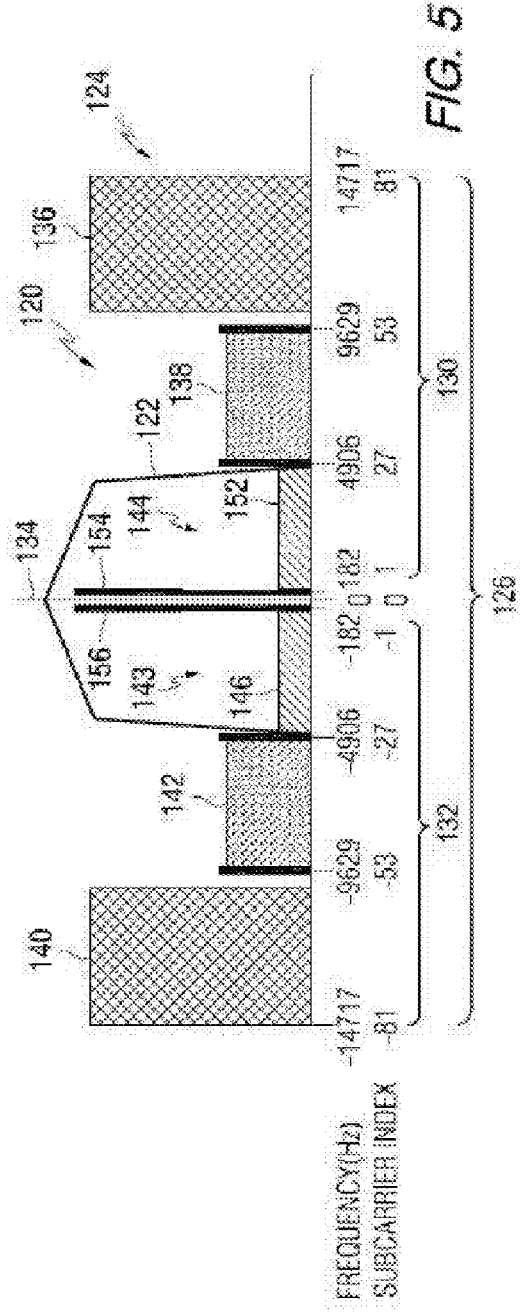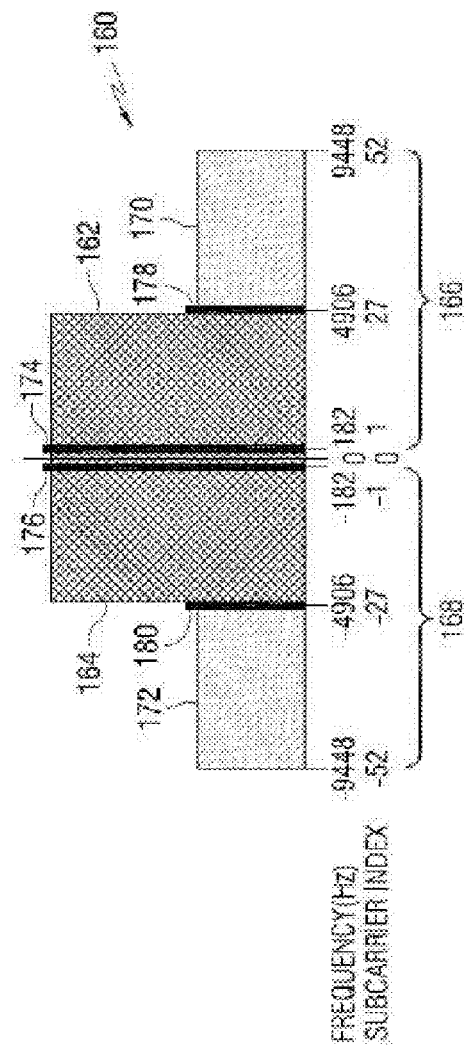

SYSTEM AND METHOD FOR INCREASING THROUGHPUT IN DIGITAL RADIO BROADCAST RECEIVER

BACKGROUND OF THE INVENTION

1. Field of the Invention

The present invention is directed in general to digital radio broadcast transmitters and receivers and methods for operating them. In one aspect, the present invention relates to a system for transmitting digital signal information to digital radio broadcast receivers with increased throughput.

2. Description of the Related Art

Digital radio broadcasting technology delivers digital audio and data services to mobile, portable, and fixed receivers using existing radio bands. One type of digital radio broadcasting, referred to as in-band on-channel (IBOC) digital radio broadcasting, transmits digital radio and analog radio broadcast signals simultaneously on the same frequency using digitally modulated subcarriers or sidebands to multiplex digital information on an AM or FM analog modulated carrier signal. HD Radio™ technology, developed by iBiquify Digital Corporation, is one example of an IBOC implementation for digital radio broadcasting and reception. With IBOC digital radio broadcasting, signals can be transmitted in a hybrid format including an analog modulated carrier in combination with a plurality of digitally modulated carriers or in an all-digital format wherein the analog modulated carrier is not used. In the hybrid mode, broadcasters may continue to transmit analog AM and FM simultaneously with higher-quality and more robust digital signals, allowing themselves and their listeners to convert from analog-to-digital radio while maintaining their current frequency allocations. Another feature of IBOC digital radio broadcasting is the digital transmission capability to simultaneously transmit both digitized audio and data so that one or more digital audio programs can be broadcast within a single logical channel, alone or in combination with data messages, such as metadata (e.g., the artist, song title, or station call letters), special messages (e.g., event, news, traffic, and weather information), or other message information that can all be scrolled across a radio receiver's display while the user listens to a radio station. While the increasing amount of digitized information (e.g., audio, data, audio and data messages) being transmitted requires increased system capabilities, the throughput of existing IBOC digital radio systems may not be sufficient for providing the increasing number of services. For example, there have been solutions proposed for increasing the system throughput while maintaining backwards compatibility to retaining existing services, but the best case expected increase in throughput was approximately 112 kbps. Such an increase in system throughput using the existing IBOC digital radio signal can be realized by creating a multi-level ('local cloud') modulation around the original constellation points of the existing IBOC digital radio signal, but such solutions may have required power increase by approximately 11 dB for bringing the new throughput performance to the already established level of performance for existing receivers. Another challenge for HD Radio system transmitter and receiver configurations using two digital sidebands for carrying the exact same payload over each sideband using complementary error correction mechanisms is the perception that, in order to maintain backwards compatibility and avoid obsoleting existing receivers, it is not possible to simultaneously use two digital sidebands in a configuration such that the payload and the error correction mechanism on one sideband (either one or both) are different from the payload and error correction mechanism on the other sideband. Because of at least the demonstrated challenges for increasing system throughput without noticeably reducing system performance (e.g., coverage), the existing solutions for delivering digital audio and data services with increasing number of services and features are extremely difficult at a practical level.

BRIEF DESCRIPTION OF THE DRAWINGS

The present invention may be understood, and its numerous objects, features and advantages obtained, when the following detailed description is considered in conjunction with the following drawings, in which:

FIG. 5 is a schematic representation of a hybrid AM IBOC waveform;

FIG. 6 is a schematic representation of an all-digital AM IBOC waveform;

DETAILED DESCRIPTION

Figure 1:
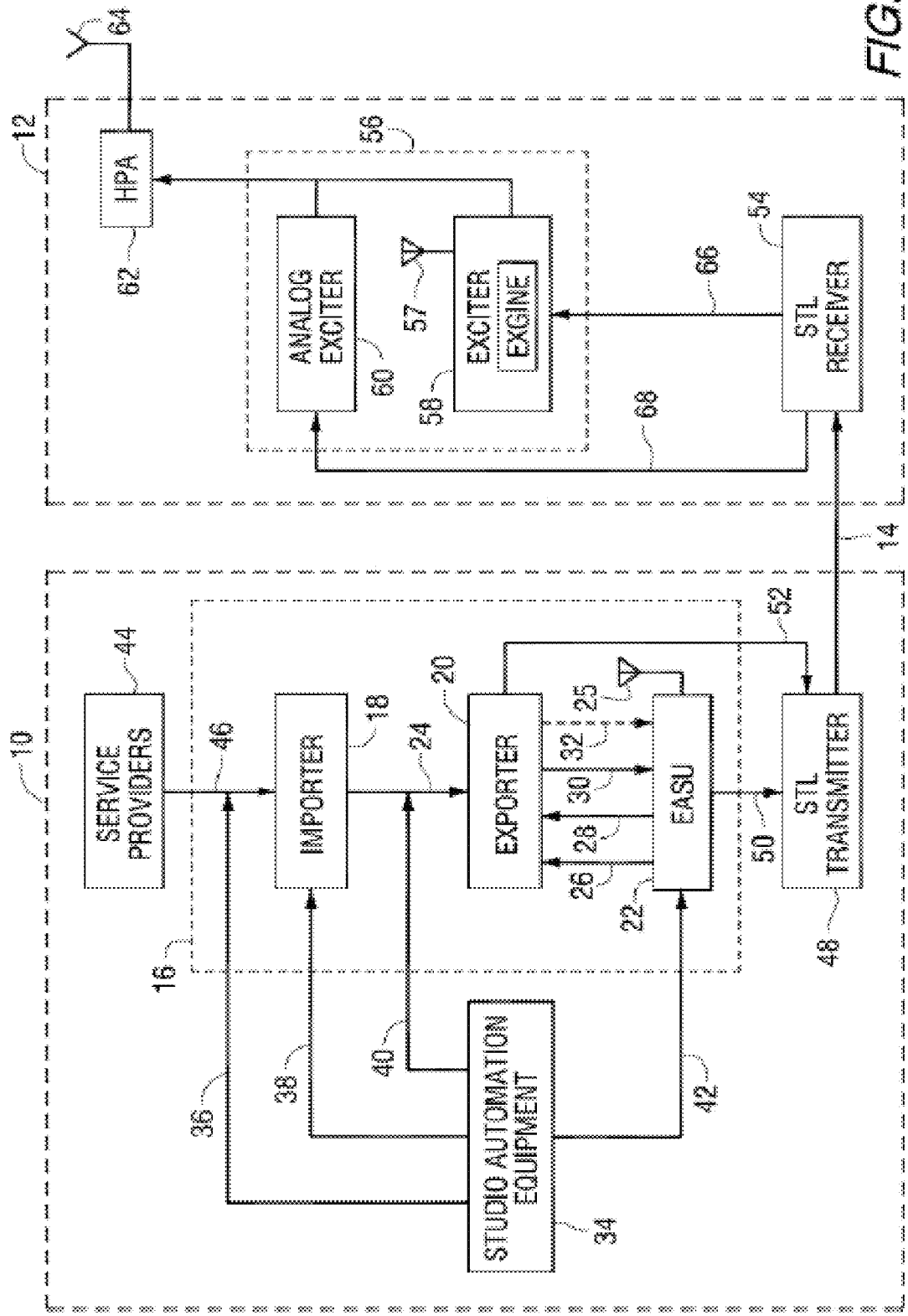
FIG. 1 illustrates a simplified block diagram of a transmitter for use in an in-band on-channel digital radio broadcasting system in accordance with certain embodiments.

A digital radio broadcast system with a transmitter and receiver apparatus and associated method(s) for operating same are described for managing digital signal throughput of an in-band on-channel (IBOC) digital radio broadcast signal to address various problems in the art where various limitations of conventional solutions and technologies will become apparent to one of skill in the art after reviewing the remainder of the present application with reference to the drawings and detailed description provided herein. In selected embodiments, enhanced digital content—that includes a first content portion (e.g., existing content for a first type of receiver, while also intended for a second type of receiver) and a second content portion (e.g., new content for a second type of receiver)—is transmitted over existing spectral resources of an IBOC digital radio broadcast signal by multiplexing first and second broadcast signals onto the IBOC signal, where the first broadcast signal transmits the first content portion using a first plurality of reference subcarriers modulated with a first (standard) reference constellation pattern, and where the second broadcast signal transmits the second content portion using a second plurality of reference subcarriers modulated with a second (modified) reference constellation pattern. In this way, the multiplexed first and second broadcast signals simultaneously serve the first type receivers (e.g., existing receivers which can decode the first broadcast signal using the first reference constellation pattern, but not the second broadcast signal) and the second type receivers (e.g., new receivers which can decode both the first and second broadcast signals using the first and second reference constellation patterns) to enable selective decoding of the enhanced digital content by the new receivers while existing receivers treat the second broadcast signal as meaningless data. To achieve increased throughput on digital radio broadcast signal payload subcarriers, the first and second reference constellation patterns may be simultaneously applied to modulate associated reference subcarriers for the first and second broadcast signals. In selected embodiments, existing payload content may be broadcast on a first group of payload subcarriers which are associated with a first plurality of reference subcarriers of the digital radio broadcast signal that are digitally modulated using the first reference constellation pattern. Simultaneously, new digital payload content may be broadcast on a second group of payload subcarriers which are associated with a second plurality of reference subcarriers that are digitally modulated using the second reference constellation pattern. If desired, the second group of payload subcarriers may be digitally modulated using either a first (standard) payload constellation pattern or a second (modified) payload constellation pattern. By properly choosing and applying the constellation patterns to the reference and payload subcarriers, the digital radio broadcast signal may be processed at a first type receiver to produce a first coherent reference signal estimate from the first group of reference subcarriers in the first broadcast signal to extract the existing payload content for playback, and to produce a second coherent reference signal estimate from the second group of reference subcarriers in the second broadcast signal to disregard the new digital payload content.

As disclosed herein, signal multiplexing may employ a "separate partitions" scheme such that a first (old) content portion is provided over a first partition or sideband while a second (new or enhanced) content portion is simultaneously provided over a second, different partition or sideband. In other embodiments, signal multiplexing may employ a "shared partition" scheme such that the first and second content portions are alternated in time over a shared partition or sideband. In other embodiments, signal multiplexing may employ a "shared subcarrier" scheme such that the first and second content portions are simultaneously provided over separate I and Q components of specified subcarriers within a given partition or sideband. In whichever signal multiplexing scheme is employed, selected subcarrier resources in the IBOC signal are reallocated to the second or enhanced content portion in such a way that existing receivers treat the second/enhanced content portion as meaningless data, such as by modulating selected reference subcarriers for the second/enhanced content portion at the broadcast transmitter with a non-standard reference constellation pattern to appear as noise at the existing receiver(s), thereby producing erasure information (or close to that) for the Viterbi decoder at the existing receiver(s). By configuring new receivers to correctly demodulate the selected reference subcarriers for the second/enhanced content portion, the new receivers are able to correctly process the payload subcarriers associated with the selected reference subcarriers and extract the second/enhanced digital content portion, thereby efficiently increasing signal throughput and system performance in an IBOC digital radio broadcast system while maintaining backward compatibility with existing receivers. In this way, a wide range of throughput increase (e.g., up to at least 269 Kbps) may be achieved with an efficient deployment scheme which allocates existing spectral resources to the second/enhanced digital content for processing by new receivers while causing existing receivers to perceive the allocated resources as noise with limited adverse effects (e.g., the loss of one digital sideband or partition), thereby achieving the ability to independently control the performance of existing services and new or enhanced throughput-based services. In selected implementations, a "shared partition" scheme may be employed to support throughput increase by approximately 201 kbps with a total system power increase of approximately 7.5-8.5 dB in order to fully regain the established performance for existing receivers so that the added throughput is provided at the same performance level as the initial throughput.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. Some portions of the detailed descriptions provided herein are presented in terms of algorithms and instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIGS. 1-14 and the accompanying description herein provide a general description of an exemplary IBOC system, exemplary broadcasting equipment structure and operation, and exemplary receiver structure and operation. FIGS. 15-20 and the accompanying description herein provide a detailed description of exemplary approaches for increasing the IBOC system throughput in accordance with exemplary embodiments of the present disclosure. Whereas aspects of the disclosure are presented in the context of an exemplary IBOC system, it should be understood that the present disclosure is not limited to IBOC systems and that the teachings herein are applicable to other forms of digital radio broadcasting as well.

As referred to herein, a service is any analog or digital medium for communicating content via radio frequency broadcast. For example, in an IBOC radio signal, the analog modulated signal, the digital main program service, and the digital supplemental program services could all be considered services. Other examples of services can include conditionally accessed programs (CAs), which are programs that require a specific access code and can be audio such as, for example, a broadcast of a game or a concert. Additional examples of services can include data services such as, for example, a traffic update service, multimedia and other files, and program service guides (EPGs). A service identifier as referred to herein refers to a particular service. For example, if an analog modulated signal is centered at 94.1 MHz, then a service identifier could refer to the radio frequency of 94.1 MHz. Additionally, the same broadcast in IBOC digital radio broadcasting can include a number of supplemental audio and data services and each could have its own service identifier. Also, a data unit may refer to individual bits, nibbles, bytes, or any other unit of data.

Referring now to FIG. 1, there is shown a functional block diagram of exemplary components of a studio site 10, an FM transmitter site 12, and a studio transmitter link (STL) 14 that can be used to broadcast an FM IBOC digital radio broadcasting signal. The studio site 10 includes, among other things, studio automation equipment 34, an Ensemble Operations Center (EOC) 16 that includes an importer 18, an exporter 20, and an exciter auxiliary service unit (EASU) 22. An STL transmitter 48 links the EOC 16 with the transmitter site 12. The depicted transmitter site 12 includes an STL receiver 54, an exciter 56 that includes an exciter engine (exgine) subsystem 58, and an analog exciter 60. While the exporter 20 is shown in FIG. 1 as residing at a radio station's studio site 10 and the exciter 60 is located at the transmission site 12, these elements may be co-located at the transmission site 12.

At the studio site 10, the studio automation equipment 34 supplies main program service (MPS) audio 42 to the EASU 22, MPS data 40 to the exporter 20, supplemental program service (SPS) audio 38 to the importer 18, and SPS data 36 to the importer 18. MPS audio serves as the main audio programming source. In hybrid modes, it preserves the existing analog radio programming formats in both the analog and digital transmissions. MPS data or SPS data, also known as program service data (PSD), includes information such as music title, artist, album name, etc. Supplemental program service can include supplementary audio content as well as program service data.

The importer 18 contains hardware and software for supplying advanced application services (AAS). AAS can include any type of data that is not classified as MPS, SPS, or Station Information Service (SIS). SIS provides station information, such as call sign, absolute time, position correlated to GPS, etc. Examples of AAS include data services for electronic program guides, navigation maps, real-time traffic and weather information, multimedia applications, other audio services, and other data content. The content for AAS can be supplied by service providers 44, which provide service data 46 to the importer via an application program interface (API). The service providers may be a broadcaster located at the studio site or externally sourced third-party providers of services and content. The importer can establish session connections between multiple service providers. The importer encodes and multiplexes service data 46, SPS audio 38, and SPS data 36 to produce exporter link data 24, which is output to the exporter via a data link. As part of the AAS, the importer also encodes a Service Information Guide (SIG), in which it typically identifies and describes services. For example, the SIG may include data identifying the genre of the services available on the current frequency (e.g., the genre of MPS audio and any SPS audio).

The exporter 20 contains the hardware and software necessary to supply the main program service and SIS for broadcasting. The exporter accepts digital MPS audio 26 over an audio interface and compresses the audio. The exporter also multiplexes MPS data 40, exporter link data 24, and the compressed digital MPS audio to produce exciter link data 52. In addition, the exporter accepts analog MPS audio 28 over its audio interface and applies a pre-programmed delay to it to produce a delayed analog MPS audio signal 30. This analog audio can be broadcast as a backup channel for hybrid IBOC digital radio broadcasting broadcasts. The delay compensates for the system delay of the digital MPS audio, allowing receivers to blend between the digital and analog program without a shift in time. In an AM transmission system, the delayed MPS audio signal 30 is converted by the exporter to a mono signal and sent directly to the STL as part of the exciter link data 52.

The EASU 22 accepts MPS audio 42 from the studio automation equipment 34, rate converts it to the proper system clock, and outputs two copies of the signal, one digital (26) and one analog (28). The EASU 22 includes a GPS receiver that is connected to an antenna 25. The GPS receiver allows the EASU to derive a master clock signal, which is synchronized to the exciter's clock by use of GPS units. The EASU provides the master system clock used by the exporter. The EASU is also used to bypass (or redirect) the analog MPS audio from being passed through the exporter in the event the exporter has a catastrophic fault and is no longer operational.

The bypassed audio 32 can be fed directly into the STL transmitter, eliminating a dead-air event.

STL transmitter 48 receives delayed analog MPS audio 50 and exciter link data 52. It outputs exciter link data and delayed analog MPS audio over STL link 14, which may be either unidirectional or bidirectional. The STL link 14 may be a digital microwave or Ethernet link, for example, and may use the standard User Datagram Protocol or the standard TCP/IP.

The transmitter site 12 includes an STL receiver 54, an exciter engine (exgine) 56 and an analog exciter 60. The STL receiver 54 receives exciter link data, including audio and data signals as well as command and control messages, over the STL link 14. The exciter link data 66 is passed to the exciter 56, which produces the IBOC digital radio broadcasting waveform. The exciter includes a host processor, digital up-converter, RF up-converter, and exgine subsystem 58. The exgine accepts exciter link data and modulates the digital portion of the IBOC digital radio broadcasting waveform. The digital up-converter of exciter 56 converts from digital-to-analog the baseband portion of the exgine output. The digital-to-analog conversion is based on a GPS clock, common to that of the exporter's GPS-based clock derived from the EASU. Thus, the exciter 56 includes a GPS unit and antenna 57. An alternative method for synchronizing the exporter and exciter clocks can be found in U.S. Pat. No. 7,512,175, the disclosure of which is hereby incorporated by reference in its entirety. The RF up-converter of the exciter up-converts the analog signal to the proper in-band channel frequency. The up-converted signal is then passed to the high power amplifier (HPA) 62 and antenna 64 for broadcast. In an AM transmission system, the exgine subsystem coherently adds the backup analog MPS audio to the digital waveform in the hybrid mode; thus, the AM transmission system does not include the analog exciter 60. In addition, in an AM transmission system, the exciter 56 produces phase and magnitude information and the analog signal is output directly to the high power amplifier.

IBOC digital radio broadcasting signals can be transmitted in both AM and FM radio bands, using a variety of waveforms. The waveforms include an FM hybrid IBOC digital radio broadcasting waveform, an FM all-digital IBOC digital radio broadcasting waveform, an AM hybrid IBOC digital radio broadcasting waveform, and an AM all-digital IBOC digital radio broadcasting waveform.

Figure 2:
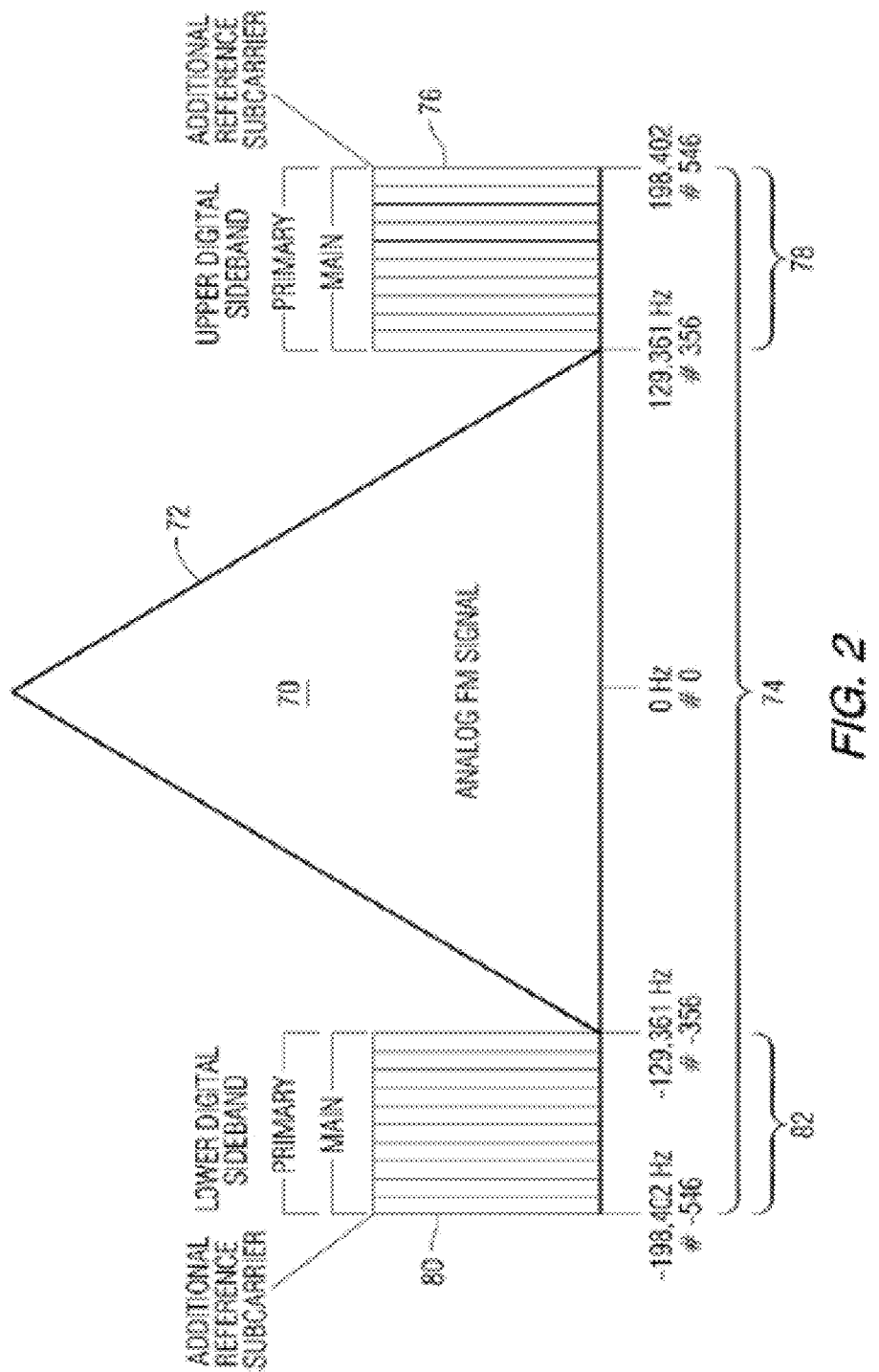
FIG. 2 is a schematic representation of a hybrid FM IBOC waveform.

FIG. 2 is a schematic representation of a hybrid FM IBOC waveform 70. The waveform includes an analog modulated signal 72 located in the center of a broadcast channel 74, a first plurality of evenly spaced orthogonally frequency division multiplexed subcarriers 76 in an upper sideband 78, and a second plurality of evenly spaced orthogonally frequency division multiplexed subcarriers 80 in a lower sideband 82. The digitally modulated subcarriers are divided into partitions and various subcarriers are designated as reference subcarriers. A frequency partition is a group of 19 OFDM subcarriers containing 18 data subcarriers and one reference subcarrier.

The hybrid waveform 70 includes an analog FM-modulated signal, plus digitally modulated primary main subcarriers. The subcarriers are located at evenly spaced frequency locations. The subcarrier locations are numbered from −546 to +546. In the depicted waveform 70, the subcarriers are at locations +356 to +546 and −356 to −546. Each primary main sideband is comprised of ten frequency partitions. Subcarriers 546 and −546, also included in the primary main sidebands, are additional reference subcarriers. The amplitude of each subcarrier can be scaled by an amplitude scale factor.

Figure 3:
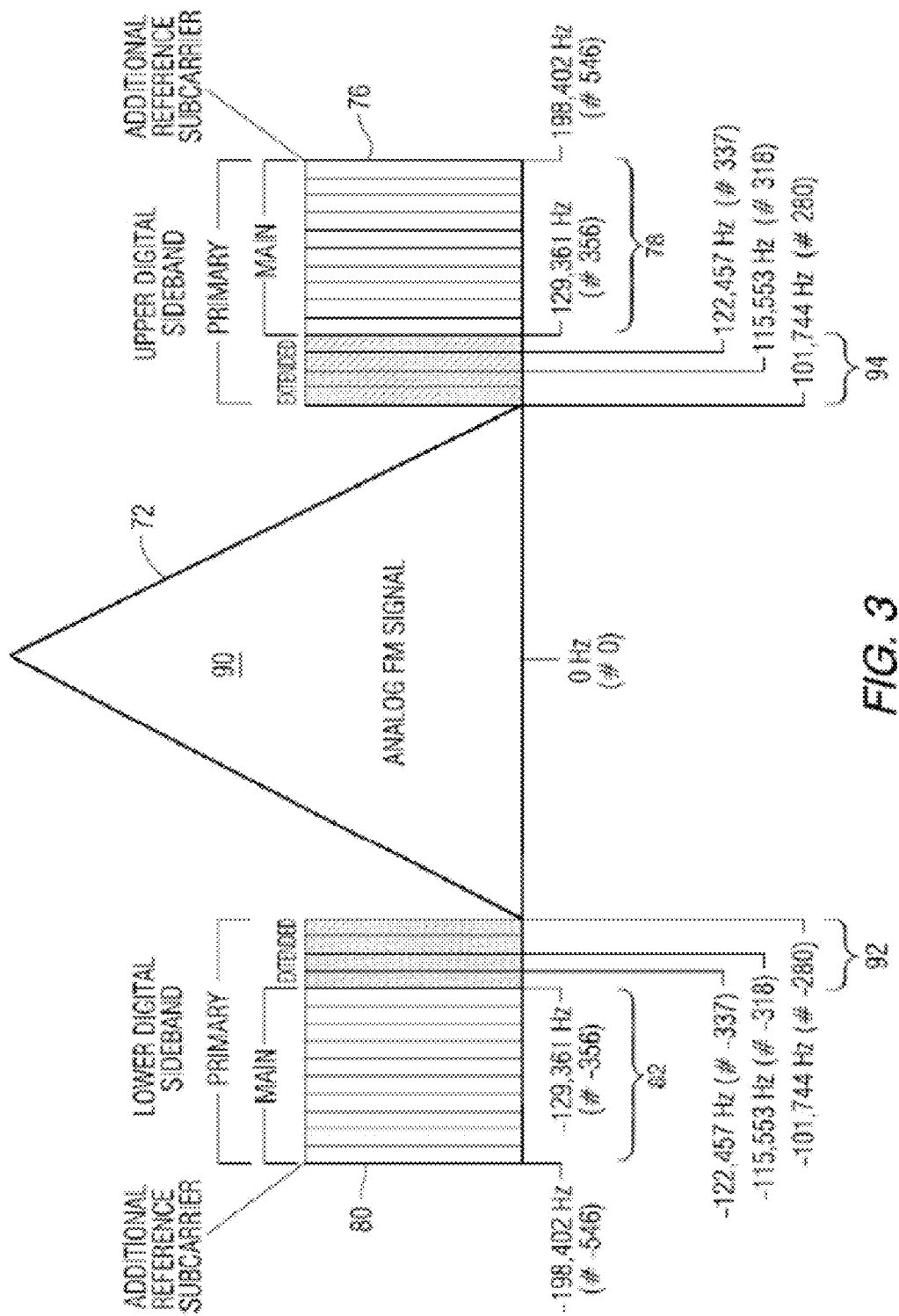
FIG. 3 is a schematic representation of an extended hybrid FM IBOC waveform.

FIG. 3 is a schematic representation of an extended hybrid FM IBOC waveform 90. The extended hybrid waveform 90 is created by adding primary extended sidebands 92, 94 to the primary main sidebands 78, 82 present in the hybrid waveform. One, two, or four frequency partitions can be added to the inner edge of each primary main sideband. The extended hybrid waveform 90 includes the analog FM signal plus digitally modulated primary main subcarriers (subcarriers +356 to +546 and −356 to −546) and some or all primary extended subcarriers (subcarriers +280 to +355 and −280 to −355).

The upper primary extended sidebands include subcarriers 337 through 355 (one frequency partition), 318 through 355 (two frequency partitions), or 280 through 355 (four frequency partitions). The lower primary extended sidebands include subcarriers −337 through −355 (one frequency partition), −318 through −355 (two frequency partitions), or −280 through −355 (four frequency partitions). The amplitude of each subcarrier can be scaled by an amplitude scale factor.

Figure 4:
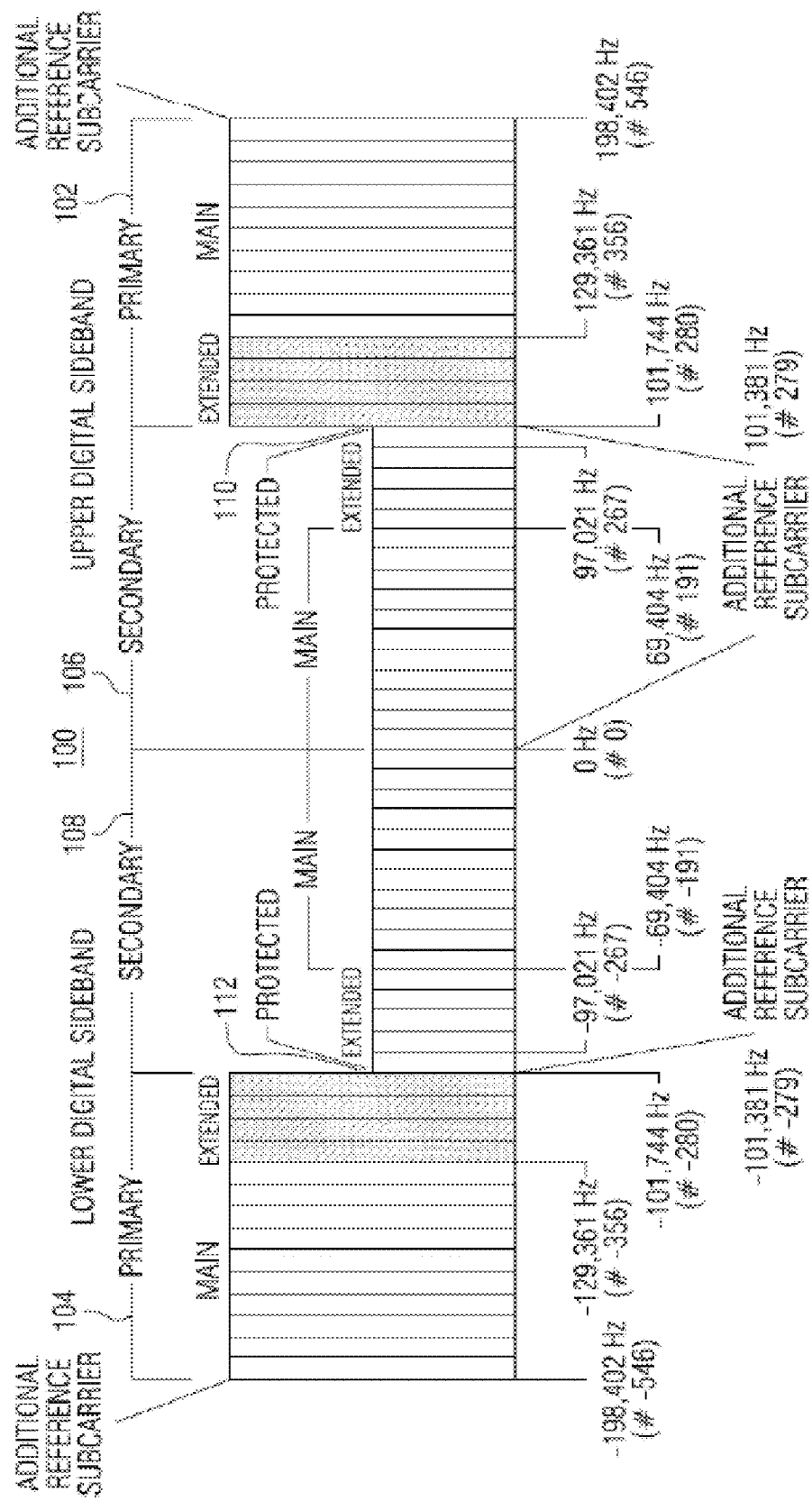
FIG. 4 is a schematic representation of an all-digital FM IBOC waveform.

FIG. 4 is a schematic representation of an all-digital FM IBOC waveform 100. The all-digital waveform 100 is constructed by disabling the analog signal, fully extending the bandwidth of the primary digital sidebands 102, 104, and adding lower-power secondary sidebands 106, 108 in the spectrum vacated by the analog signal. The all-digital waveform 100 in the illustrated embodiment includes digitally modulated subcarriers at subcarrier locations −546 to +546, without an analog FM signal.

In addition to the ten main frequency partitions, all four extended frequency partitions are present in each primary sideband of the all-digital waveform. Each secondary sideband also has ten secondary main (SM) and four secondary extended (SX) frequency partitions. Unlike the primary sidebands, however, the secondary main frequency partitions are mapped nearer to the channel center with the extended frequency partitions farther from the center.

Each secondary sideband also supports a small secondary protected (SP) region 110, 112 including 12 OFDM subcarriers and reference subcarriers 279 and −279. The sidebands are referred to as "protected" because they are located in the area of spectrum least likely to be affected by analog or digital interference. An additional reference subcarrier is placed at the center of the channel (0). Frequency partition ordering of the SP region does not apply since the SP region does not contain frequency partitions.

Each secondary main sideband spans subcarriers 1 through 190 or −1 through −190. The upper secondary extended sideband includes subcarriers 191 through 266, and the upper secondary protected sideband includes subcarriers 267 through 278, plus additional reference subcarrier 279. The lower secondary extended sideband includes subcarriers −191 through −266, and the lower secondary protected sideband includes subcarriers −267 through −278, plus additional reference subcarrier −279. The total frequency span of the entire all-digital spectrum may be up to 396,803 Hz. The amplitude of each subcarrier can be scaled by an amplitude scale factor.

In each of the waveforms 70, 90, 100, the digital signal is modulated using orthogonal frequency division multiplexing (OFDM). OFDM is a parallel modulation scheme in which the data stream modulates a large number of orthogonal subcarriers, which are transmitted simultaneously. OFDM is inherently flexible, readily allowing the mapping of logical channels to different groups of subcarriers.

In the hybrid waveform 70, the digital signal is transmitted in primary main (PM) sidebands on either side of the analog FM signal in the hybrid waveform. The power level of each sideband is separately adjusted and is appreciably below the total power in the analog FM signal. The analog signal may be monophonic or stereophonic, and may include subsidiary communications authorization (SCA) channels.

In the extended hybrid waveform 90, the bandwidth of the hybrid sidebands can be extended toward the analog FM signal to increase digital capacity. This additional spectrum, allocated to the inner edge of each primary main sideband, is termed the primary extended (PX) sideband.

In the all-digital waveform 100, the analog signal is removed and the bandwidth of the primary digital sidebands (or sideband when only one is employed) is fully extended as in the extended hybrid waveform. In addition, this waveform allows lower-power digital secondary sidebands to be transmitted in the spectrum vacated by the analog FM signal.

FIG. 5 is a schematic representation of an AM hybrid IBOC digital radio broadcasting waveform 120. The hybrid format includes the conventional AM analog signal 122 (bandlimited to about ±5 kHz) along with up to a nearly 30 kHz wide digital radio broadcasting signal 124. The spectrum is contained within a channel 126 having a bandwidth of about 30 kHz. The channel is divided into upper 130 and lower 132 frequency bands. The upper band extends from the center frequency of the channel to about +15 kHz from the center frequency. The lower band extends from the center frequency to about −15 kHz from the center frequency.

The AM hybrid IBOC digital radio broadcasting signal format in one example comprises the analog modulated carrier signal 134 plus OFDM subcarrier locations spanning the upper and lower bands. Coded digital information representative of the audio or data signals to be transmitted (program material), is transmitted on the subcarriers. The symbol rate is less than the subcarrier spacing due to a guard time between symbols.

As shown in FIG. 5, the upper band is divided into a primary section 136, a secondary section 138, and a tertiary section 144. The lower band is divided into a primary section 140, a secondary section 142, and a tertiary section 143. For the purpose of this explanation, the tertiary sections 143 and 144 can be considered to include a plurality of groups of subcarriers labeled 146 and 152 in FIG. 5. Subcarriers within the tertiary sections that are positioned near the center of the channel are referred to as inner subcarriers, and subcarriers within the tertiary sections that are positioned farther from the center of the channel are referred to as outer subcarriers. The groups of subcarriers 146 and 152 in the tertiary sections have substantially constant power levels. FIG. 5 also shows two reference subcarriers 154 and 156 for system control, whose levels are fixed at a value that is different from the other sidebands.

The power of subcarriers in the digital sidebands is significantly below the total power in the analog AM signal. The level of each OFDM subcarrier within a given primary or secondary section is fixed at a constant value. Primary or secondary sections may be scaled relative to each other. In addition, status and control information is transmitted on reference subcarriers located on either side of the main carrier. A separate logical channel, such as an IBOC Data Service (IDS) channel can be transmitted in individual subcarriers just above and below the frequency edges of the upper and lower secondary sidebands. The power level of each primary OFDM subcarrier is typically fixed relative to the unmodulated main analog carrier. However, the power level of the secondary subcarriers, logical channel subcarriers, and tertiary subcarriers is adjustable.

Using the modulation format of FIG. 5, the analog modulated carrier and the digitally modulated subcarriers are transmitted within the channel mask specified for standard AM broadcasting in the United States. The hybrid system uses the analog AM signal for tuning and backup.

FIG. 6 is a schematic representation of the subcarrier assignments for an all-digital AM IBOC digital radio broadcasting waveform. The all-digital AM IBOC digital radio broadcasting signal 160 includes first and second groups 162 and 164 of evenly spaced subcarriers, referred to as the primary subcarriers, that are positioned in upper and lower bands 166 and 168. Third and fourth groups 170 and 172 of subcarriers, referred to as secondary subcarriers, are also positioned in upper and lower bands 166 and 168. Two reference subcarriers 174 and 176 of the third group lie closest to the center of the channel. Subcarriers 178 and 180 can be used to transmit program information data.

Figure 7:
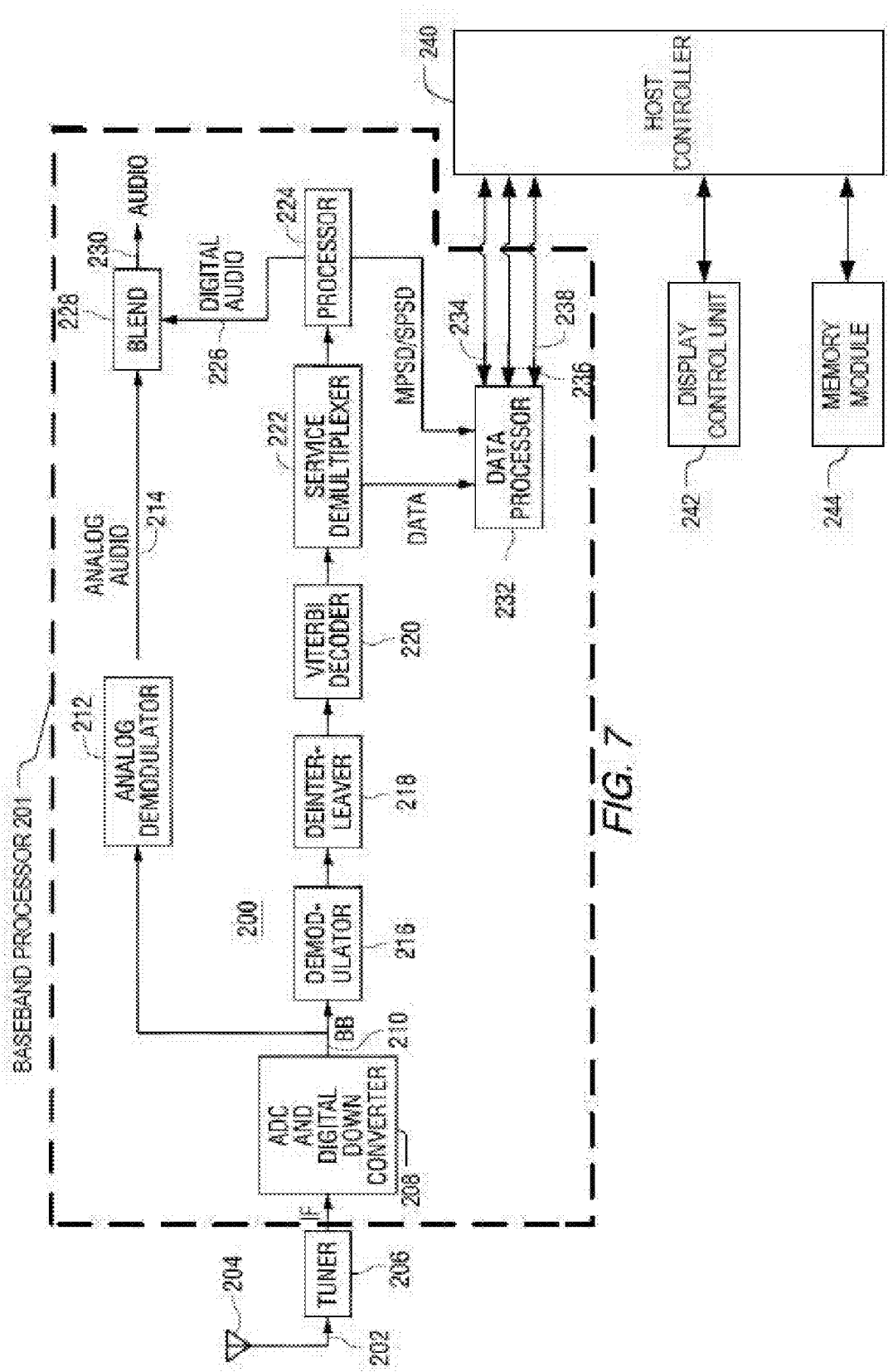
FIG. 7 is a functional block diagram of an AM IBOC digital radio receiver in accordance with certain embodiments.

FIG. 7 is a simplified functional block diagram of selected components of an exemplary AM IBOC digital radio broadcasting receiver 200. While only certain components of the receiver 200 are shown for exemplary purposes, it should be apparent that the receiver may comprise a number of additional components and may be distributed among a number of separate enclosures having tuners and front-ends, speakers, remote controls, various input/output devices, etc. The receiver 200 has a tuner 206 that includes an input 202 connected to an antenna 204. The receiver also includes a baseband processor front end 201. The analog signal from the tuner 206 is provided to an analog-to-digital converter and digital down converter 208 to produce a baseband signal at output 210 comprising a series of complex signal samples. An analog demodulator 212 demodulates the analog modulated portion of the baseband signal to produce an analog audio signal on line 214. A digital demodulator 216 demodulates the digitally modulated portion of the baseband signal. Then the digital signal is deinterleaved by a deinterleaver 218, and decoded by a Viterbi decoder 220. A service demultiplexer 222 separates main and supplemental program signals from data signals. A processor 224 processes the program signals to produce a digital audio signal on line 226. The analog and main digital audio signals are blended as shown in block 228, or a supplemental digital audio signal is passed through, to produce an audio output on line 230. A data processor 232 processes the data signals and produces data output signals on lines 234, 236 and 238. The data lines 234, 236, and 238 may be multiplexed together onto a suitable bus such as an inter-integrated circuit (I2C), serial peripheral interface (SPI), universal asynchronous receiver/transmitter (UART), or universal serial bus (USB). The data signals can include, for example, SIS, MPS data, SPS data, and one or more AAS.

The host controller 240 receives and processes the data signals (e.g., the SIS, MPSD, SPSD, and AAS signals). The host controller 240 comprises a microcontroller that is coupled to the display control unit (DCU) 242 and memory module 244. Any suitable microcontroller could be used such as an 8-bit reduced instruction set computer (RISC) microcontroller, an advanced RISC 32-bit microcontroller or any other suitable microcontroller. Additionally, a portion or all of the functions of the host controller 240 could be performed in a baseband processor (e.g., the processor 224 and/or data processor 232). The DCU 242 comprises any suitable I/O processor that controls the display, which may be any suitable visual display such as an LCD or LED display. In certain embodiments, the DCU 242 may also control user input components via touch-screen display. In certain embodiments the host controller 240 may also control user input from a keyboard, dials, knobs or other suitable inputs. The memory module 244 may include any suitable data storage medium such as RAM, Flash ROM (e.g., an SD memory card), and/or a hard disk drive. In certain embodiments, the memory module 244 may be included in an external component that communicates with the host controller 240 such as a remote control.

Figure 8:
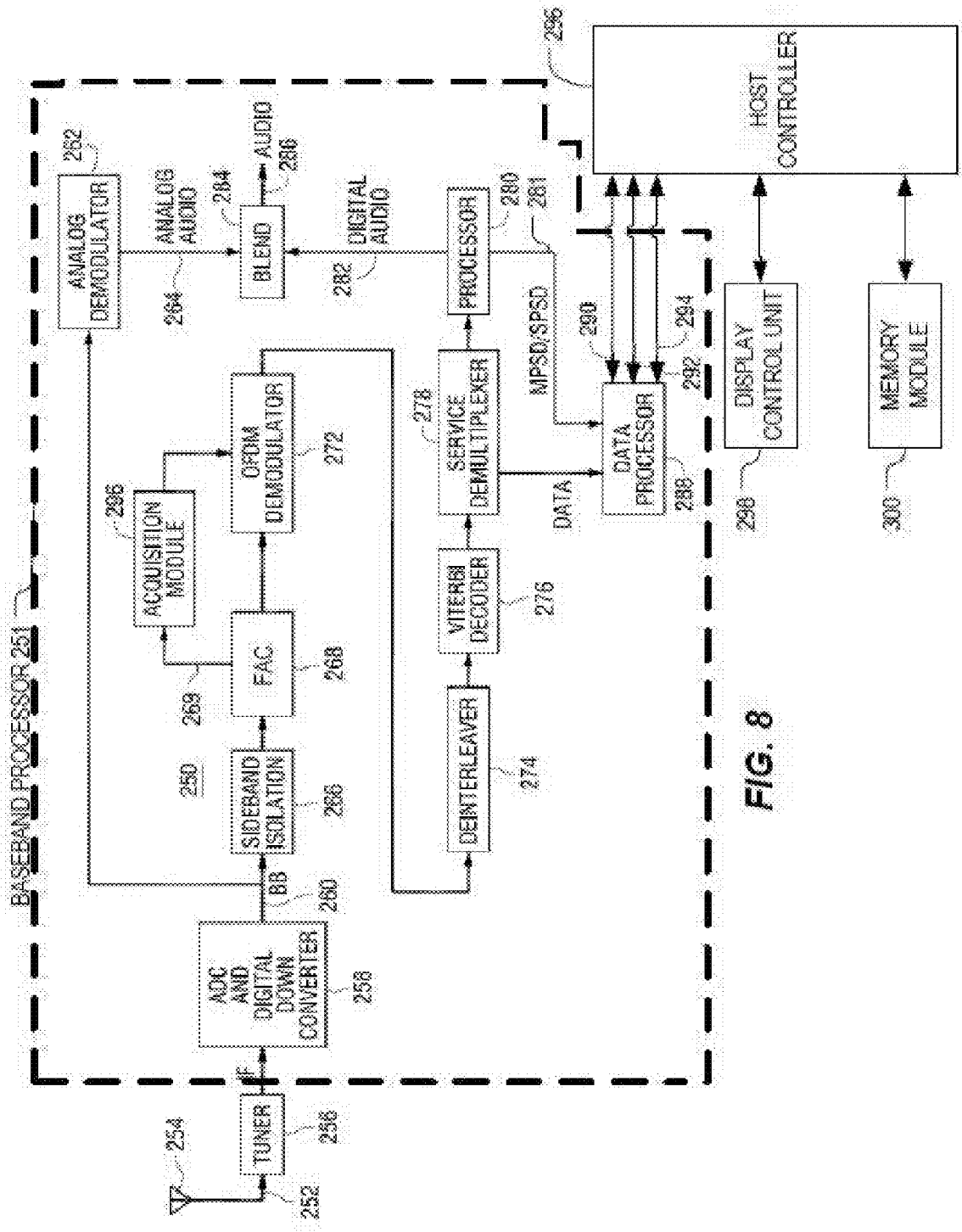
FIG. 8 is a functional block diagram of an FM IBOC digital radio receiver in accordance with certain embodiments.

FIG. 8 is a simplified functional block diagram of selected components of an exemplary FM IBOC digital radio broadcasting receiver 250. While only certain components of the receiver 250 are shown for exemplary purposes, it should be apparent that the receiver may comprise a number of additional components and may be distributed among a number of separate enclosures having tuners and front-ends, speakers, remote controls, various input/output devices, etc. The exemplary receiver includes a tuner 256 that has an input 252 connected to an antenna 254. The receiver also includes a baseband processor front end 251. The analog signal from the tuner 256 is provided to an analog-to-digital converter and digital down converter 258 to produce a baseband signal at output 260 comprising a series of complex signal samples. The signal samples are complex in that each sample comprises a "real" component and an "imaginary" component. An analog demodulator 262 demodulates the analog modulated portion of the baseband signal to produce an analog audio signal on line 264. The digitally modulated portion of the sampled baseband signal is next filtered by isolation filter 266, which has a pass-band frequency response comprising the collective set of subcarriers f1-fn present in the received OFDM signal. First adjacent canceller (FAC) 268 suppresses the effects of a first-adjacent interferer. Complex signal 269 is routed to the input of acquisition module 296, which acquires or recovers OFDM symbol timing offset or error and carrier frequency offset or error from the received OFDM symbols as represented in received complex signal 269. Acquisition module 296 develops a symbol timing offset $\Delta t$ and carrier frequency offset $\Delta f$, as well as status and control information. The signal is then demodulated (OFDM Demodulator block 272) to demodulate the digitally modulated portion of the baseband signal. Then the digital signal is deinterleaved by a deinterleaver 274, and decoded by a Viterbi decoder 276. A service demultiplexer 278 separates main and supplemental program signals from data signals. A processor 280 processes the main and supplemental program signals to produce a digital audio signal on line 282 and MPSD/SPSD 281. At blend block 284, the analog and main digital audio signals 264, 282 are blended, or the supplemental program signal is passed through, to produce an audio output on line 286. A data processor 288 processes the data signals and produces data output signals on lines 290, 292 and 294. The data lines 290, 292 and 294 may be multiplexed together onto a suitable bus such as an I2C, SPI, UART, or USB. The data signals can include, for example, SIS, MPS data, SPS data, and one or more AAS.

The host controller 296 receives and processes the data signals (e.g., SIS, MPS data, SPS data, and AAS). The host controller 296 comprises a microcontroller that is coupled to the DCU 298 and memory module 300. Any suitable microcontroller could be used such as an 8-bit RISC microcontroller, an advanced RISC 32-bit microcontroller or any other suitable microcontroller. Additionally, a portion or all of the functions of the host controller 296 could be performed in a baseband processor (e.g., the processor 280 and/or data processor 288). The DCU 298 comprises any suitable I/O processor that controls the display, which may be any suitable visual display such as an LCD or LED display. In certain embodiments, the DCU 298 may also control user input components via a touch-screen display. In certain embodiments the host controller 296 may also control user input from a keyboard, dials, knobs or other suitable inputs. The memory module 300 may include any suitable data storage medium such as RAM, Flash ROM (e.g., an SD memory card), and/or a hard disk drive. In certain embodiments, the memory module 300 may be included in an external component that communicates with the host controller 296 such as a remote control.

In practice, many of the signal processing functions shown in the receivers of FIGS. 7-8 can be implemented using one or more integrated circuits. For example, while the signal processing block, host controller, DCU, and memory module are shown in FIGS. 7-8 as separate components, the functions of two or more of these components could be combined in a single processor (e.g., a System on a Chip (SoC)).

Figure 9A:
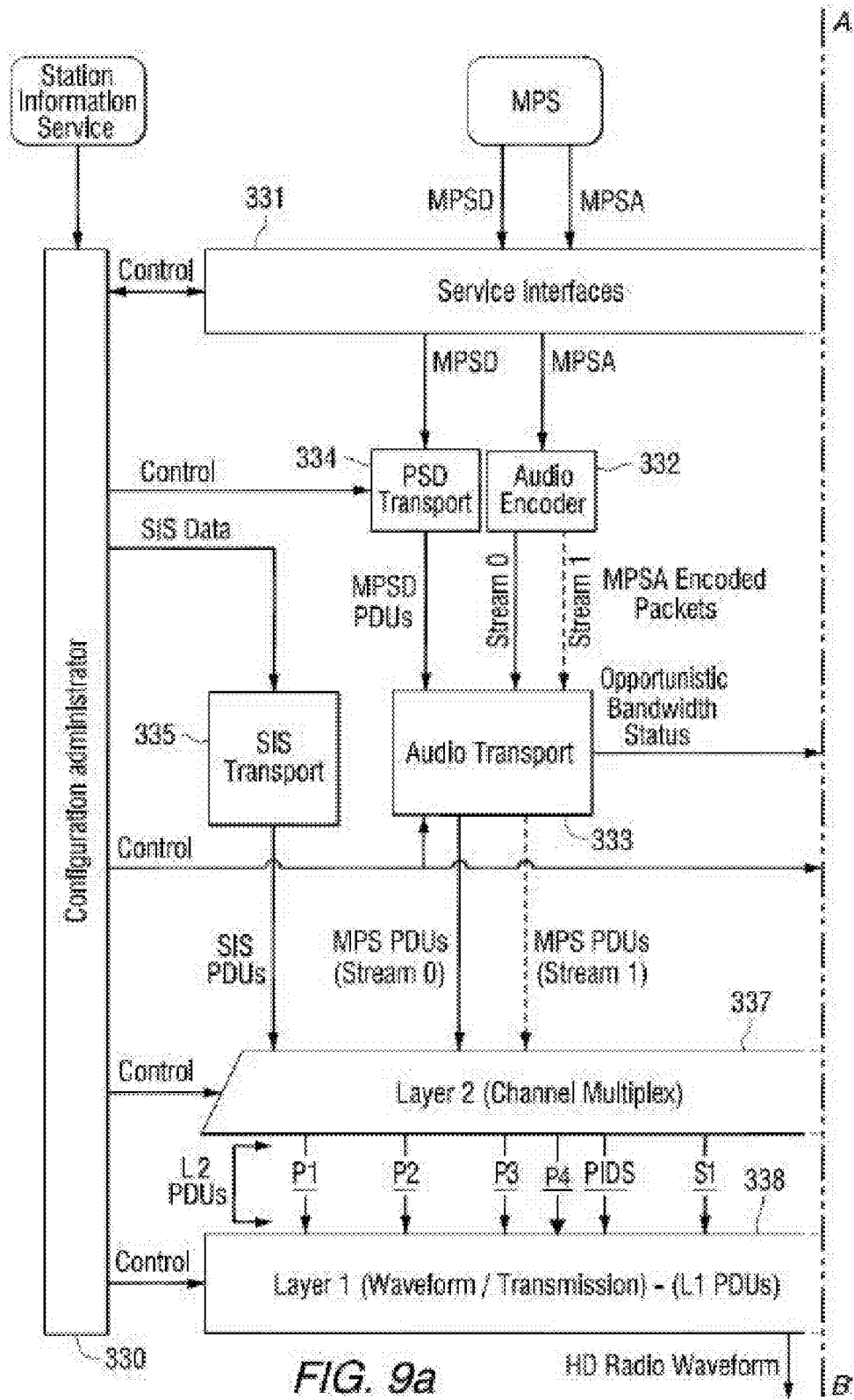
FIGS. 9a and 9b are diagrams of an IBOC digital radio broadcasting logical protocol stack from the broadcast perspective.
Figure 9B:
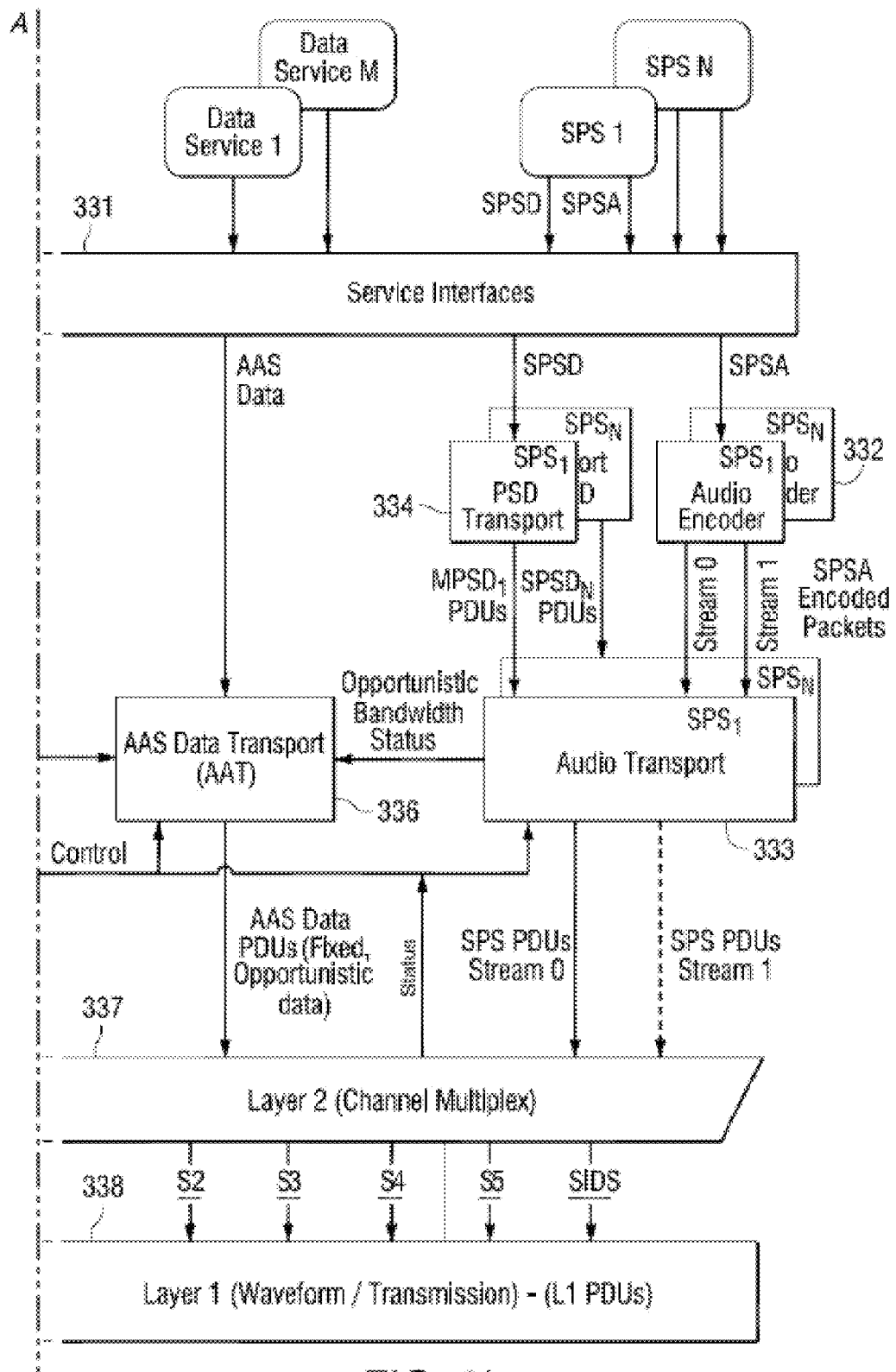

FIGS. 9a-b show diagrams of an IBOC digital radio broadcasting logical protocol stack from the transmitter perspective. From the receiver perspective, the logical stack will be traversed in the opposite direction. Most of the data being passed between the various entities within the protocol stack are in the form of protocol data units (PDUs). A PDU is a structured data block that is produced by a specific layer (or process within a layer) of the protocol stack. The PDUs of a given layer may encapsulate PDUs from the next higher layer of the stack and/or include content data and protocol control information originating in the layer (or process) itself. The PDUs generated by each layer (or process) in the transmitter protocol stack are inputs to a corresponding layer (or process) in the receiver protocol stack.

As shown in FIGS. 9a-b, there is a configuration administrator 330, which is a system function that supplies configuration and control information to the various entities within the protocol stack. The configuration/control information can include user defined settings, as well as information generated from within the system such as GPS time and position. The service interfaces 331 represent the interfaces for all services. The service interface may be different for each of the various types of services. For example, for MPS audio and SPS audio, the service interface may be an audio card. For MPS data and SPS data the interfaces may be in the form of different APIs. For all other data services the interface is in the form of a single API. An audio encoder 332 encodes both MPS audio and SPS audio to produce core (Stream 0) and optional enhancement (Stream 1) streams of MPS and SPS audio encoded packets, which are passed to audio transport 333. Audio encoder 332 also relays unused capacity status to other parts of the system, thus allowing the inclusion of opportunistic data. MPS and SPS data is processed by PSD transport 334 to produce MPS and SPS data PDUs, which are passed to audio transport 333. Audio transport 333 receives encoded audio packets and PSD PDUs and outputs bit streams containing both compressed audio and program service data. The SIS transport 335 receives SIS data from the configuration administrator and generates SIS PDUs. A SIS PDU can contain station identification and location information, indications regarding provided audio and data services, as well as absolute time and position correlated to GPS, as well as other information conveyed by the station. The AAS data transport 336 receives AAS data from the service interface, as well as opportunistic bandwidth data from the audio transport, and generates AAS data PDUs, which can be based on quality of service parameters. The transport and encoding functions are collectively referred to as Layer 4 of the protocol stack and the corresponding transport PDUs are referred to as Layer 4 PDUs or L4 PDUs. Layer 2 (337), which is the channel multiplex layer, receives transport PDUs from the SIS transport, AAS data transport, and audio transport, and formats them into Layer 2 PDUs. A Layer 2 PDU includes protocol control information and a payload, which can be audio, data, or a combination of audio and data. Layer 2 PDUs are routed through the correct logical channels to Layer 1 (338), wherein a logical channel is a signal path that conducts L1 PDUs through Layer 1 with a specified grade of service, and possibly mapped into a predefined collection of subcarriers. There are multiple Layer 1 logical channels based on service mode, wherein a service mode is a specific configuration of operating parameters specifying throughput, performance level, and selected logical channels. The number of active Layer 1 logical channels and the characteristics defining them vary for each service mode. Status information is also passed between Layer 2 and Layer 1. Layer 1 converts the PDUs from Layer 2 and system control information into an AM or FM IBOC digital radio broadcasting waveform for transmission. Layer 1 processing can include scrambling, channel encoding, interleaving, OFDM subcarrier mapping, and OFDM signal generation. The output of OFDM signal generation is a complex, baseband, time domain pulse representing the digital portion of an IBOC signal for a particular symbol. Discrete symbols are concatenated to form a continuous time domain waveform, which is modulated to create an IBOC waveform for transmission.

Figure 10:
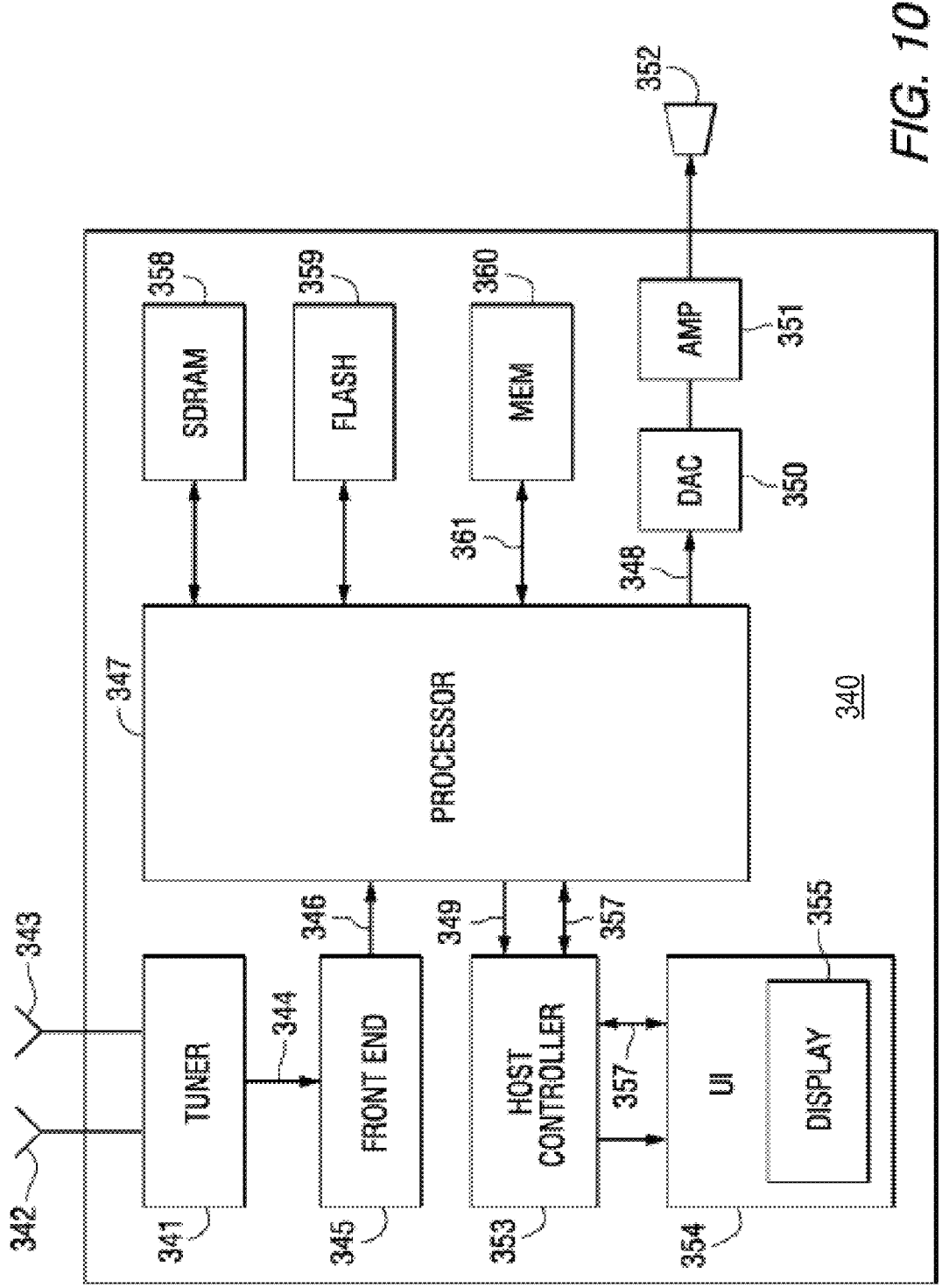
FIG. 10 is a simplified block diagram of an IBOC DAB receiver.

FIG. 10 is a simplified block diagram of an IBOC DAB receiver 340 with components that will allow the reception and selective decoding of an IBOC digital radio broadcast signal having content multiplexed enhanced digital content. As will be appreciated, the general architecture of the IBOC DAB receiver 340 may be used for either an existing receiver (which cannot decode the enhanced digital content) or a new receiver (which can decode the enhanced digital content) based on the programmed functionality executed or implemented at the receiver 340. The receiver 340 includes a tuner 341 having inputs for connecting an AM antenna 342 and an FM antenna 343 for receiving radio signals, which may be modulated with an all-digital, all analog, or hybrid IBOC waveform. The tuner produces an intermediate frequency (IF) signal 344 that is passed to a front end circuit 345, which transforms the IF signal to baseband signal 346. A processor 347 processes the baseband signal according to the logical protocol stack described by FIGS. 9a and 9b, but in reverse order, to produce a decoded digital audio signal 348 and a decoded digital data signal 349. Digital-to-analog converter 350 converts the decoded digital audio signal to an analog signal and passes it to an amplifier 351. Output device 352, which can be one or more speakers, headphones, or any other type of audio output device, produces an audio output. Decoded digital data signal 349 is passed to a host controller 353. The host controller sends digital data to a user interface (UI) 354, which can include a display 355 for outputting visual representations of the data such as text or images. The host controller also exchanges status and control information 357 with the processor and user interface.

The receiver includes memories 358 and 359 for use by the processor, which may share a memory bus for communicating with the processor, and memory 360 for storing program content selected by the user. Memory 360 is preferably a non-removable storage device such as a multimedia card (MMC). Other suitable types of memory devices may be used, such as a hard disc, flash memory, USB memory, memory stick, etc.

Figure 11:
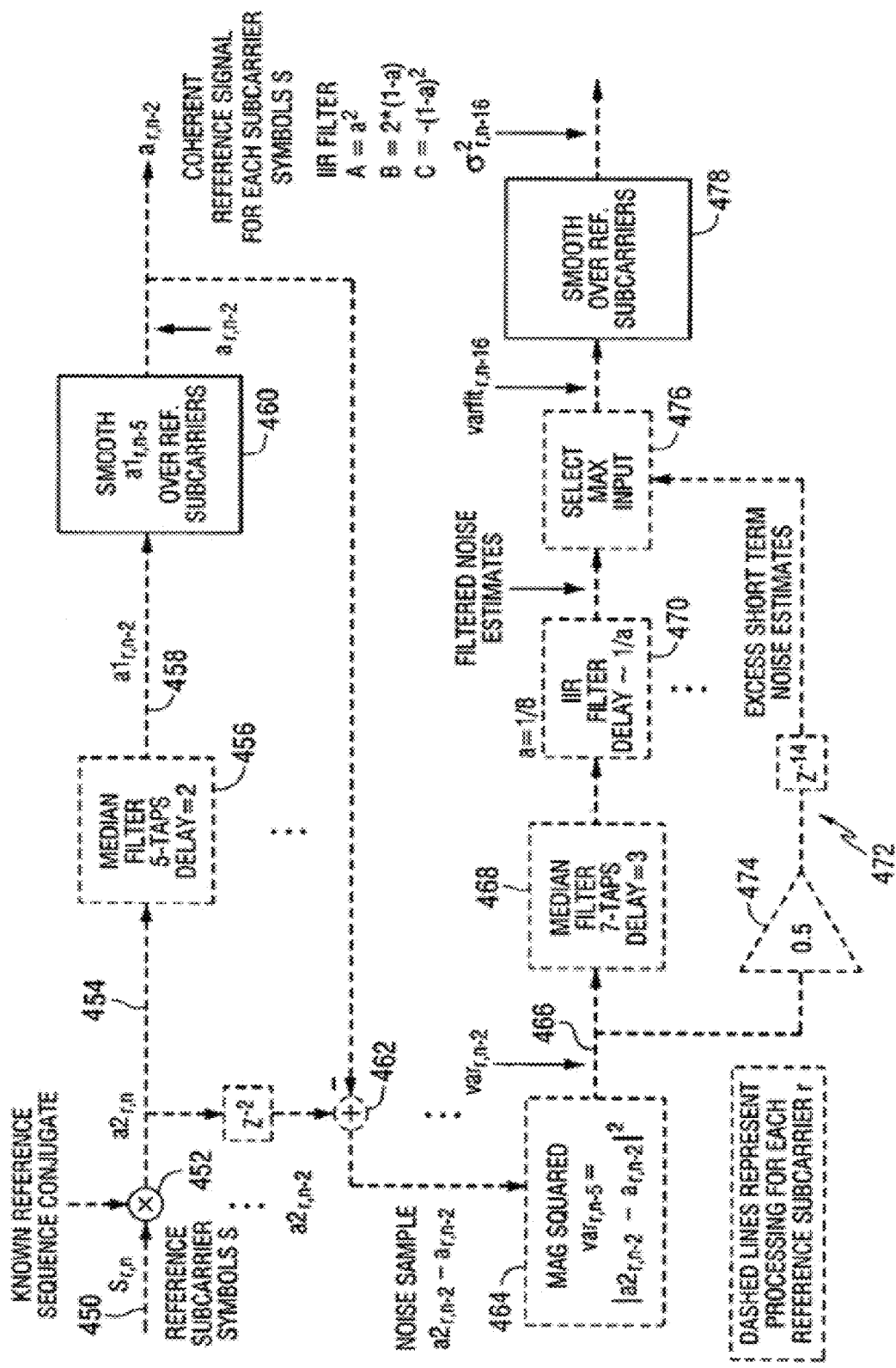
FIG. 11 is a simplified block diagram of reference carrier signal detection and noise estimation processing functions used to coherently track an IBOC digital radio signal.

FIG. 11 is a simplified block diagram of reference carrier signal detection and noise estimation processing functions used to coherently track an IBOC digital radio signal by providing estimates of the coherent channel complex gain ("a" values) along with estimates of the noise or interference that are local in time and frequency (subcarrier location) to accommodate the dynamic selective fading channel experience in a mobile environment such as a moving automobile. These estimates are derived from the reference subcarrier symbols which have been stripped from the received and demodulated signal as previously described, and are input on line 450 as $S_{r,n}$ complex values. The data used to modulate these symbols is already known and removed from these symbols with the first conjugate multiply operation (illustrated by multiplier 452) to yield the instantaneous complex channel gain values $a2_{r,n}$ on line 454. The subsequent median filtering 456 in time reduces the noise while maintaining the step changes due to antenna switching to produce intermediate values $a1_{r,n-2}$ on line 458. These intermediate values are further filtered (smoothed) over the reference subcarriers (in frequency) as shown in block 460 to produce the final complex channel gain values $a_{r,n-2}$. These $a_{r,n-2}$ gain values may be used later outside this algorithm to process (e.g., equalize and provide branch metric information) the signal constellations for the data bearing symbols in the conventional manner for QAM symbol demodulation.

The next step in this process is to estimate the noise associated with each of these complex channel gain values. The instantaneous noise samples are estimated by subtracting the $a_{r,n-2}$ values from the (appropriately delayed) noisy corresponding input samples $a2_{r,n-2}$, as illustrated by summation point 462. As shown in block 464, the magnitude-squared values are computed from these complex noise samples to yield the instantaneous noise variance estimates $var_{r,n-2}$ on line 466. These instantaneous noise variance samples are rough estimates of the local (time and frequency) noise, and require processing and filtering to produce refined noise variance estimates. Although simpler time and frequency filtering would normally be used to reduce the error of these instantaneous noise variance estimates, this type of filtering would not effectively accommodate the changing noise due to fading, AGC action and step changes due to antenna switching. Therefore, selected embodiments will filter the instantaneous noise variance samples in time with a median filter 468, such as a 7-tap median filter, followed by an IIR filter 470 with a delay of approximately a=1/8. With the median and IIR filtering 468, 470, there is minimal degradation in a stationary AWGN channel while providing significantly improved performance in fading with a fast AGC, and diversity antenna switching transients, and the resulting noise estimation error of only the IIR and frequency filters is then roughly 22 dB better than the variance of a single noise sample input to the filter. The resulting filtered samples $varflt_{r,n-16}$ are provided to a smoothing filter 478 (e.g., linear IIR or FIR filter) to further smooth across frequency (subcarriers) to produce the final variance estimates $\sigma^2_{r,n-16}$ in a manner similar to the complex channel gain estimates above. An additional feed forward path 472 is provided to capture the relatively large noise impulses that occur due to the antenna switching or other abrupt noise changes. When these values (scaled by a factor 0.5 as shown in block 474) exceed the median-filtered estimate, then these larger values are selected for output to the frequency smoothing filter by the select max function illustrated in block 476. These values are then smoothed over the reference subcarriers as shown in block 278. This is important in subsequent formation of the branch metrics which exploits this knowledge of the large noise impulses. Additional details for coherently tracking one or more reference subcarriers can be found in U.S. Pat. No. 7,724,850, the disclosure of which is hereby incorporated by reference in its entirety. In general, the reference and noise estimation processing functions may be used to evaluate the final variance estimates $\sigma^2_{r,n-16}$ to erase bits carried by any of the reference carrier signals which have been determined to be corrupted or unacceptably degraded.

Figure 12:
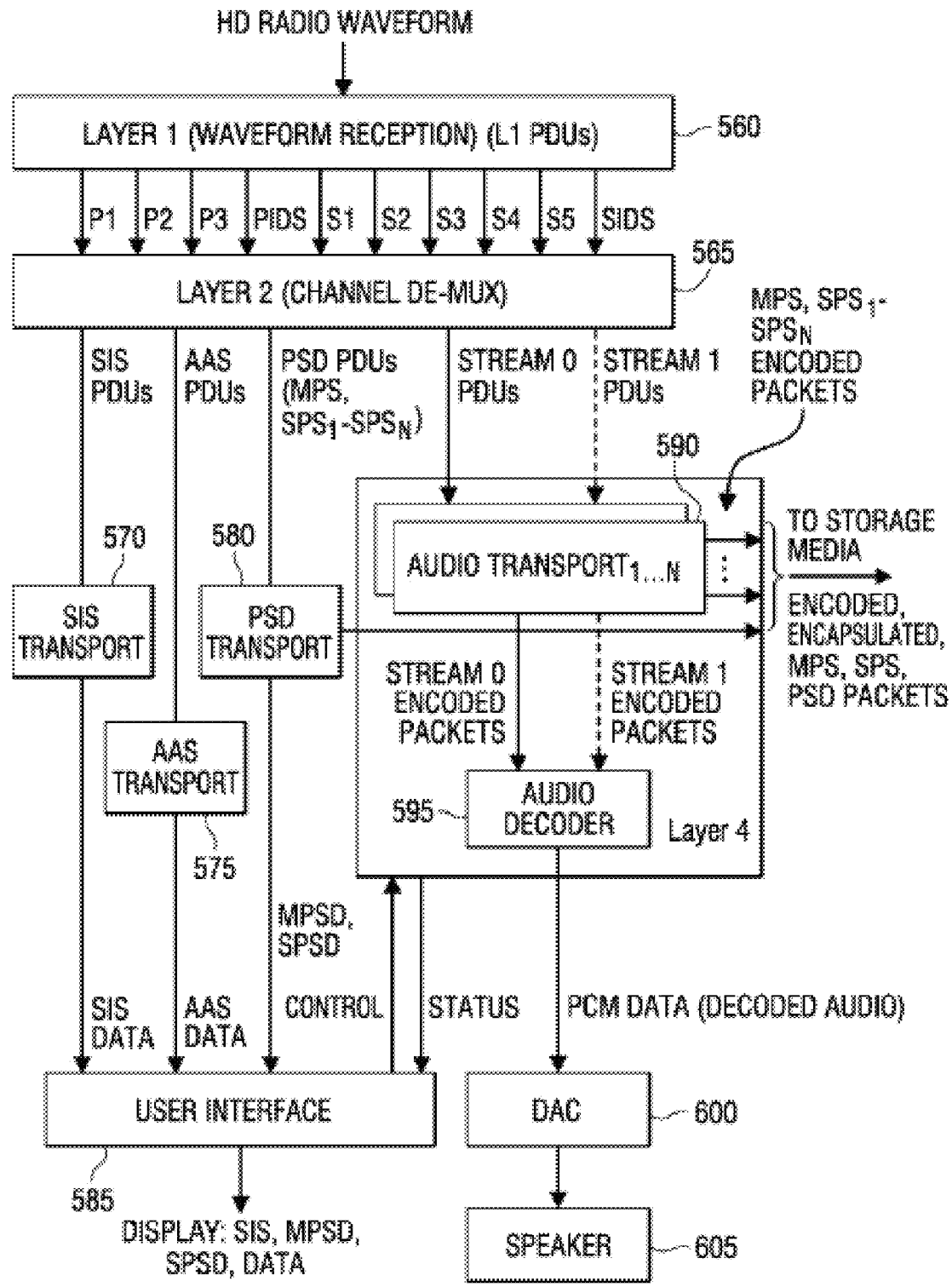
FIG. 12 is a diagram of an FM IBOC digital radio broadcasting logical protocol stack from the receiver perspective.

FIG. 12 shows the logical protocol stack from the receiver perspective. An FM IBOC waveform is received by the physical layer, Layer 1 (560), which demodulates the signal and processes it to separate the signal into logical channels. The number and kind of logical channels will depend on the service mode, and may include logical channels P1-P4, Primary IBOC Data Service Logical Channel (PIDS), S1-S5, and SIDS. In addition, logical channels for data services may be divided into sub-channels by, for example, time-division multiplexing. These sub-channels can provide additional divisibility of the logical channels to facilitate a wider variety of data services.

Layer 1 produces L1 PDUs corresponding to the logical channels and sends the PDUs to Layer 2 (565), which demultiplexes the L1 PDUs to produce SIS PDUs, AAS PDUs, and Stream 0 (core) audio PDUs and Stream 1 (optional enhanced) audio PDUs. The SIS PDUs are then processed by the SIS transport 570 to produce SIS data, the AAS PDUs are processed by the AAS transport 575 to produce AAS data, and the PSD PDUs are processed by the PSD transport 580 to produce MPS data (MPSD) and any SPS data (SPSD). Encapsulated PSD data may also be included in AAS PDUs, thus processed by the AAS transport processor 575 and delivered on line 577 to PSD transport processor 580 for further processing and producing MPSD or SPSD. The SIS data, AAS data, MPSD and SPSD are then sent to a user interface 585. The SIS data, if requested by a user, can then be displayed. Likewise, MPSD, SPSD, and any text based or graphical AAS data can be displayed. The Stream 0 and Stream 1 PDUs are processed by Layer 4, comprised of audio transport 590 and audio decoder 595. There may be up to N audio transports corresponding to the number of programs received on the IBOC waveform. Each audio transport produces encoded MPS packets or SPS packets, corresponding to each of the received programs. Layer 4 receives control information from the user interface, including commands such as to store or play programs, and information related to seek or scan for radio stations broadcasting an all-digital or hybrid IBOC signal. Layer 4 also provides status information to the user interface.

Figure 13:
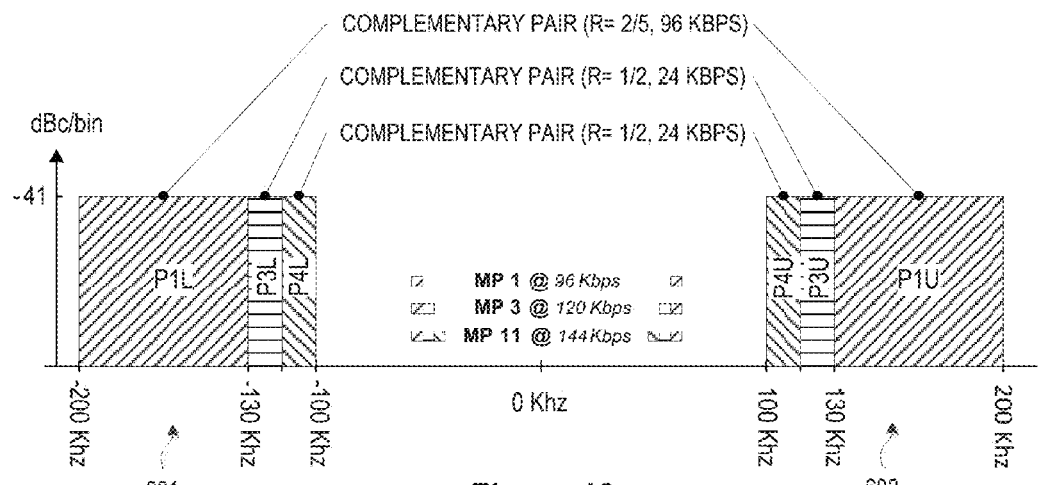
FIG. 13 is a schematic representation of the throughput with conventional HD Radio FM systems which employ standard signal patterns or constellation points to modulate reference and payload subcarriers in a complementary pair of digital sidebands.
Figure 14:
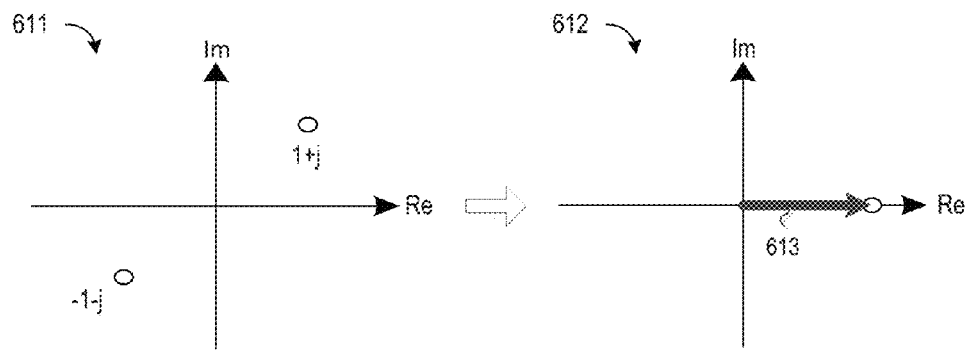
FIG. 14 illustrates a standard broadcast reference subcarrier signal constellation and associated receiver-calculated magnitude and phase as calculated by existing (i.e., standard-based) receivers.

To provide additional context for selected example embodiments of the present disclosure, reference is now made to FIG. 13 which provides a schematic representation of the throughput with conventional IBOC digital radio broadcast systems which employ standard signal patterns or constellation points to modulate reference and payload subcarriers in complementary pair of digital sidebands. With such conventional systems, lower 601 and upper 602 sidebands of the digital or hybrid FM IBOC waveform are coupled together by introducing complementary encoded pairs of the same content onto the coupled pairs when the broadcasting system places the encoded bits in appropriate subcarriers after interleaving them first. Referring back to the schematic representation of the extended hybrid FM IBOC waveform shown in FIG. 3, each of the lower and upper digital sidebands 601, 602 includes a plurality of evenly spaced orthogonally frequency division multiplexed subcarriers. The digitally modulated subcarriers are divided into partitions and various subcarriers are designated as reference subcarriers. A frequency partition is a group of 19 OFDM subcarriers containing 18 data subcarriers and one reference subcarrier. With this arrangement, first upper and lower bands P1U/P1L (which correspond to the upper and lower digital sidebands 78, 82 in FIG. 3) provide a first conventional system mode MP1 with a raw throughput of 240 kbps (2×120) that may be used to carry 96 kbps of net throughput for the P1 channel in a first conventional system mode MP1, resulting in a coding rate of r=2/5. In similar fashion, second upper and lower bands P3U/P3L (which correspond, respectively, to extended subcarriers +318 to +355 and extended subcarriers −318 to −355) provide a raw throughput of 48 kbps (2×24) that may be used to carry 24 kbps of net throughput for the P3 channel, resulting in a coding rate of r=1/2. With the combination of the P1 and P3 channels, a second conventional system mode MP3 provides a combined net throughput of 120 Kbps (96+24). Finally, third upper and lower bands P4U/P4L (which correspond, respectively, to extended subcarriers +280 to +317 and extended subcarriers −280 to −317) provide a raw throughput of 48 kbps (2×24) that may be used to carry 24 kbps of net throughput for the P4 channel, resulting in a coding rate of r=1/2. With the combination of the P1, P3, and P4 channels, a third conventional system mode MP11 provides a combined net throughput of 144 Kbps (96+24+24).

In conventional IBOC digital radio broadcast signals, each frequency partition in the lower and upper digital sidebands 601, 602 uses the data subcarriers to convey signal content, while the reference subcarriers convey system control information and serve as reference for associated data subcarriers. To illustrate how the reference and data subcarriers are modulated for broadcast to receivers in a conventional HD Radio FM system, reference is now made to FIG. 14 which shows a standard reference subcarrier signal constellation 611 that is used to modulate reference subcarriers, along with an associated magnitude and phase constellation 612 calculated at the receiver for existing fixed reference subcarriers. In particular, the reference subcarriers used for regular signal broadcast employ only one reference value along with the transmitted data {0;1}, resulting in a standard reference subcarrier signal constellation 611 having two standard constellation points (1−j and −1−j). This is expected by the existing receivers, and as shown in the magnitude/phase constellation 612, results (under optimal reception conditions) in producing a reference vector 613 which has a reference phase value of 0° and resides solely on the real axis, resulting in an extremely low value for noise variance.

In order to increase the net throughput from the conventional IBOC digital radio broadcast systems such as depicted in FIG. 13, selected embodiments of the present disclosure provide a transmitter and receiver apparatus and associated method(s) of operation to manage and control digital signal throughput of an in-band on-channel (IBOC) digital radio broadcast signal by multiplexing standard reference subcarriers and non-standard (or modified) reference subcarriers to send, respectively, existing digital content and new digital content on the IBOC signal. Upon reception and decoding of the multiplexed reference subcarriers, existing receivers use standard reference subcarrier demodulation techniques to decode the existing digital content while treating the new digital content as meaningless data, while new receivers use modified reference subcarrier demodulation techniques to decode the new digital content (in addition to using the standard reference subcarriers to decode the existing digital content), thereby enabling selective decoding of the new digital content by the new receivers while existing receivers decode only the old digital content. To enable selective decoding, the modulation of the non-standard (or modified) reference subcarriers in the IBOC signal is controlled so that existing receivers decode the non-standard/modified reference subcarriers as meaningless data that is sufficiently close to noise to produce erasure information for the Viterbi decoder. In the disclosed reference subcarrier multiplexing embodiments, selected subcarrier resources are allocated to the new digital content (which can be decoded only by the new receivers) instead of to the existing digital content (which can be decoded by the existing or older receivers), thereby reducing the raw throughput for the existing digital content without changing the net throughput of the IBOC digital radio broadcast system. As a result, the code rate for the existing digital content may be reduced.

As disclosed herein, the enhanced digital content having first and second content portions may be transmitted using existing spectral resources of an IBOC digital radio broadcast signal by employing shared partitions, shared subcarriers, or separate partitions. When transmitting enhanced digital content over a shared partition, the first and second content portions may be time multiplexed over the shared partition by alternating in time the transmission of the first content portion (e.g., existing content for existing receivers) and the second content portion (e.g., new content for new receivers) over the shared partition. However, when transmitting enhanced digital content over shared subcarriers, the first and second content portions are simultaneously provided over separately designated subcarriers within a specified partition. And when transmitting enhanced digital content over separate partitions, the first content portion is sent over a first partition while the second content portion is simultaneously sent over a second, different partition. Generally speaking, broadcasting enhanced digital content over shared partitions and shared subcarriers preserves relatively high robustness with minimal degradation for existing content transmitted in the first content portion, but with limited throughput for the new digital content transmitted in the second content portion. On the other hand, broadcasting enhanced digital content over separate partitions can achieve higher throughput for the new digital content transmitted in the second content portion, but with relatively lower robustness (and slightly higher degradation) for the existing content transmitted in the first content portion. As will be appreciated, each approach employs different signaling to introduce the new digital content to the new receivers while still properly communicating the existing content to the existing receivers. Process management and signaling for shared partitions and shared subcarriers may be more complicated than for separate partitions. In addition, shared partitions and shared subcarriers methods are more sensitive to sub-optimal demodulation implementation in certain older receivers, and therefore may be considered less attractive for throughput increase comparing to multiplexing over separate partitions.

To enable selective decoding of the enhanced digital content, there must be a complete separation or decoupling of the existing digital content (that is broadcast for existing receivers that are configured to receive the existing digital content using the standard reference subcarriers and that are unaware of the increased throughput) from the new digital content (that uses the increased throughput by using modified reference subcarriers). In selected embodiments, the decoupling and separate processing ranges from the access layer (L4/L5) to the physical layer (L1), and applies to raw data and/or raw audio content, multiplexing, encoding and interleaving. Indeed, the coupling between the two processing chains may occur only at the stage of bit placement on the subcarriers, where specified subcarriers may be used for joint placement of existing digital content bits and new digital content bits.

In order to preserve backwards compatibility with existing digital IBOC receivers, the allocation of spectral resources for broadcasting enhanced digital content to achieve increased net throughput does not change the number and spacing of subcarriers, and also maintains the existing ratio (18:1) between payload subcarriers and reference subcarrier as used with conventional digital IBOC signals. Instead, the increased throughput is achieved by modifying the constellation point mapping and configuration of the existing reference subcarriers where applicable while broadcasting the new content on the data subcarriers that are associated with the modified reference subcarriers. In other embodiments, payload subcarriers modulation is modified where applicable.

1. Separate Partitions

In selected content multiplexing embodiments which employ separate partitions or sidebands to simultaneously convey first and second content portions of the enhanced digital content, the first content portion (e.g., existing content for a first type of receiver) is broadcast in a first payload subcarrier group of a first dedicated partition that are controlled by first reference subcarriers which are mapped with a standard reference subcarrier signal constellation (e.g., 611), while a second content portion (e.g., new content for a second type of receiver) is simultaneously broadcast in a second payload subcarrier group of a second, different partition that are controlled by second reference subcarriers which are mapped with a non-standard or modified reference subcarrier signal constellation (e.g. 701), as described hereinbelow. Both new and existing receivers can decode the first content portion from the first payload subcarrier group by using the standard reference subcarrier signal constellation to demodulate the first reference subcarriers in the first dedicated partition. However, existing receivers are prevented from decoding the second content portion from the second payload subcarrier group by configuring the second reference subcarrier group with the non-standard or modified reference subcarrier signal constellation to be detected by the existing receivers as erasure information (or close to that) at all times. In contrast, the second content portion can be decoded at new receivers which are configured to use the non-standard or modified reference subcarrier signal constellation to demodulate the second reference subcarrier group from the second, different partition. To meet both configuration objectives, selected embodiments of the present disclosure configure second reference subcarrier group (but not necessarily the associated second payload subcarrier group) from the second dedicated partition or sideband to be effectively hidden or destroyed so that the existing receivers detect high noise variance and low reference magnitude when demodulating the second reference subcarrier group with the standard reference subcarrier signal constellation, thereby effectively erasing data information from the associated second payload subcarrier group. This destructive configuration of the second reference subcarrier group also prevents the second reference subcarrier group from affecting any phase/frequency tracking calculations for the first dedicated partition or sideband.

In selected embodiments, the destructive configuration of a reference subcarrier group exploits the reference carrier signal detection and noise estimation processing calculations that are implemented in the existing receivers (such as described with reference to FIG. 11) by configuring selected reference subcarriers in a dedicated partition or sideband with a modified constellation that is not expected by the existing receivers. To understand this approach, reference is now made to FIG. 15 which illustrates a broadcast reference subcarrier signal constellation and rotation 701 and associated magnitude and phase 702 calculated at the existing receiver which expects existing fixed reference subcarriers. As indicated with the white circles in the broadcast reference subcarrier signal constellation (e.g., 611 in FIG. 14), it must first be understood that, for regular reception of a first content portion (e.g., existing digital content) on a first payload subcarrier group of the digital IBOC signals, the associated reference subcarriers employ a reference value along with the transmitted reference bit data {0;1}, resulting in only two original constellation points (1+j and −1−j), as indicated below in Table 1. This is expected by the existing receivers, and results (under optimal reception conditions) in producing reference phase value of 0° so that the reference vector (e.g., 613) resides solely on the real axis with an extremely low value for noise variance, as indicated with the white circle in the receiver-calculated reference subcarrier magnitude and phase constellation (e.g., 612).

TABLE 1

Reference Subcarrier Constellation for Separate Partitions

| Symbol no. (in a block) | Reference Bit | Original Constellation | Modified Constellation |
|---|---|---|---|
| n + 0 | 1 | (1 + j1) | (1 − j1) |
| n + 1 |   |   | (−1 − j1) |
| n + 2 |   |   | (−1 + j1) |
| n + 3 |   |   | (1 + j1) |
| n + 0 | 0 | (−1 − j1) | −(1 − j1) |
| n + 1 |   |   | −(−1 − j1) |
| n + 2 |   |   | −(−1 + j1) |
| n + 3 |   |   | −(1 + j1) | where n = {0 . . . 28}

Figure 15:
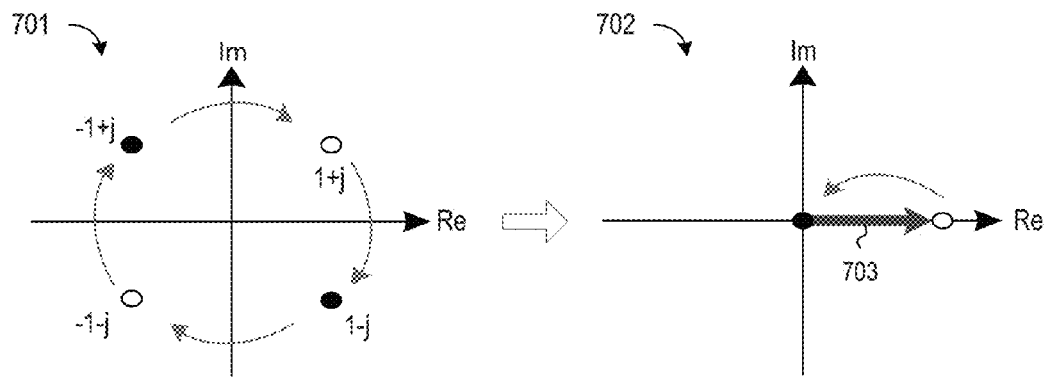
FIG. 15 illustrates a broadcast reference subcarrier signal constellation and rotated signal in accordance with selected embodiments and associated receiver-calculated magnitude and phase as calculated by existing receivers.
Figure 16:
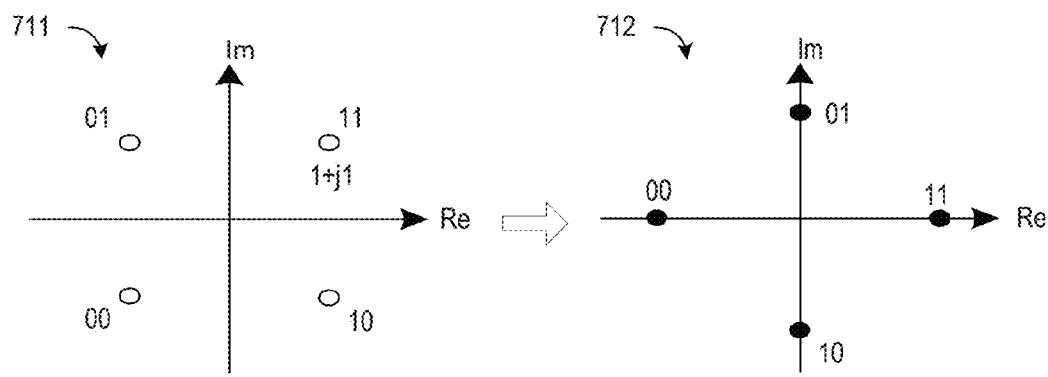
FIG. 16 illustrates an existing and rotated QPSK constellation used for the broadcast payload subcarrier signal constellation in accordance with selected embodiments.

To effectively destroy or hide the reference subcarriers from existing receivers, the reference subcarrier is mapped with a modified or non-standard constellation so that the reference subcarriers are rotated by 90° (multiplied by −j1) from one symbol to the next symbol. In FIG. 15, the broadcast reference subcarrier signal constellation 701 illustrates this with the clockwise arrows which move from a first constellation point (1+j indicated with a white circle) to a second constellation point (1−j indicated with a black circle) to a third constellation point (−1−j indicated with a white circle) to a fourth constellation point (−1+j indicated with a black circle), and so on. On the broadcasting side, this results in a modified constellation 701 in which four constellation points are sequentially repeated every four symbols along with the transmitted data, as indicated in Table 1. On the receiver side, the modified constellation 701 for the reference subcarriers results (under optimal reception conditions) in existing receivers calculating the data-stripped individual reference subcarriers as a rotating vector over the values {1;−j;−1;j}, resulting in "zeroed" filtered reference subcarrier vector values {0±j0} after passing through the median filter and smoothed across frequencies. The computed filtered reference subcarrier vector resulting from the rotated reference subcarrier is indicated with the black circle in the calculated reference subcarrier magnitude and phase 702. This smoothed reference value results in calculating significant noise levels for the individual samples, followed by significantly high filtered noise variance estimates. Consequently, the noise variance normalized data metrics, which are already reduced by interpolating with 'near-zero' reference subcarrier vector, result in erasure levels (or otherwise very low relative values). In addition to rotating the reference subcarriers in the partition/sideband dedicated to conveying new digital content, the broadcast payload subcarriers for new digital content may also be configured to incrementally further reduce data metrics. In selected embodiments, an incremental or additional reduction in the data metrics may be achieved by rotating the broadcast constellation used for the broadcast payload subcarrier signal constellation to be aligned with the axis, thus reducing the number of constellation points that can result in calculating higher metric values. To illustrate this data metric reduction technique, reference is made to FIG. 16 which illustrates an existing QPSK payload subcarrier signal constellation 711 and a modified QPSK payload subcarrier signal constellation 712 which is rotated clockwise by 45° until aligned with the axis. By using the rotated QPSK constellation points 712 when broadcasting the payload subcarriers in the dedicated partition/sideband for new digital content, an incremental data metric reduction may be obtained when the existing receiver experiences reception conditions that result in a filtered reference subcarrier vector deviating from the desired filtered subcarrier vector values {0±j0}. However, it will be appreciated that the usefulness of rotating the payload subcarrier constellation points may be minimal under certain signal conditions. For example, when higher modulation schemes, such as 16QAM, are employed to deliver new digital content over the dedicated partition/sideband, the incremental advantage to metric reduction from constellation rotation is expected to be negligible due to remaining constellation points that cannot be aligned with any axis.

In considering whether to employ the modified subcarrier signal constellations over the symbol sequence, the acquisition capabilities of the receivers should be considered. For example, selected embodiments of the digital IBOC system may use one or more digital partitions or sidebands with modified or rotated constellations in a standalone mode. In such cases, a reference pattern should be used which has a short and simple periodicity in order to facilitate signal acquisition by requiring only limited computation during an initial digital signal acquisition. While standalone sidebands/partitions will be aiming at new receivers, such standalone sidebands/partitions must still be obscured from existing or older receivers.

2. Shared Partitions

In selected content multiplexing embodiments which employ shared partitions or sidebands, payload over the shared partition/sideband is alternated in time between the first and second content portions of the enhanced digital content. During the first predetermined time intervals that are used for broadcasting the first content portion (e.g., existing content for a first type of receiver), the existing receivers are configured to demodulate the reference subcarriers using the standard reference subcarrier signal constellation (e.g., 611), thereby accessing the associated payload subcarriers which convey the first content portion. However, during the second predetermined time intervals that are used for broadcasting the second content portion (e.g., new content for a second type of receiver), existing receivers are prevented from demodulating the payload subcarriers which convey the second content because the associated reference subcarriers are mapped with a non-standard or modified reference subcarrier signal constellation, as described herein, and are therefore detected by the existing receivers as erasure information (or close to that). As described above, the second content portion may be broadcast over the shared partition/sideband by configuring the reference subcarriers (but not necessarily the data payload subcarriers) during the second predetermined time intervals with a modified constellation of four constellation points to effectively hide or destroy the reference subcarriers from the existing receivers, thereby effectively erasing data information. However, during the first predetermined time intervals that are used for broadcasting the first content portion, all receivers (new and old) are configured to properly receive and decode the first content portion from the shared partition/sideband, such as by using the established IBOC digital signaling format. When switching the shared partition/sideband between new and old content, the challenge is in controlling the transitions where the old receivers need to either start ignoring or disregarding the new content or start properly receiving old content.

To enable successful signal reception transitions when the digital IBOC signal transitions from transmitting the first content portion to transmitting the second content portion, the shared partition/sideband is configured so that, during the second predetermined time intervals, the reference subcarriers start employing a deceptive reference pattern, where a "deceptive" reference pattern refers to a reference pattern which "deceives" existing receivers into decoding the second content portion as meaningless data or noise. Within a few symbols, this reference pattern causes existing receivers (which cannot decode the second content portion) to calculate "zeroed" filtered subcarrier vector values {0±j0} after being filtered through the median filter and smoothed across frequencies. The "zeroed" filtered subcarrier vector values result in high noise samples that result in high noise variance estimates at the output of the noise variance estimation process, such as described with reference to FIG. 11. However, these high noise variance estimates are due to the bypass option (e.g., provided by additional feed forward path 472) which allows responses to sudden or abrupt noise increases. The noise filtering path (e.g., the median filter 468 and the following IIR filter 470) follows much behind the sudden or abrupt increase in noise to gradually build higher noise estimates.

When the digital IBOC signal transitions back to one of the first predetermined time intervals from the second predetermined time intervals, the reference subcarrier broadcast must be restored to its original or standard constellation to allow for proper demodulation of the first content portion. In the existing receiver, the noise bypass may become irrelevant and not contribute further to high noise estimates. However, the slow response of the noise filtering process in reducing the noise estimates may degrade the data metrics for the duration of up to several symbols of the old content. Therefore, the challenge is to define the alternating interval duration along with the proper temporary deceptive reference pattern for the reference subcarriers. An interval that is too short may result in insufficient deception (e.g., a computed signal-to-noise ratio exceeds a signal-to-noise threshold cut-off so that the existing receivers continue attempting to decode the second content portion), while an interval that is too long will likely degrade the reception of existing content at existing receivers.

While any desired interval and deceptive reference pattern may be employed, selected embodiments of the present disclosure have employed the modified constellation shown in Table 2 as the deceptive reference pattern over an interval of up to four symbols to achieve minimal or unnoticeable demodulation degradation of existing content conveyed in the first content portion, along with optimal or maximized destruction of the new digital content conveyed in the second content portion at the existing receivers. Such intervals allow for minimal noise buildup by the noise filter.

TABLE 2

Reference Subcarrier Constellation for Shared Partitions

| Symbol no. (in a block) | Reference Bit | Original Constellation | Modified Constellation |
|---|---|---|---|
| $4 \cdot n + 0$ | 1 | $(1 + j1)$ | $(-1 + j1)$ |
| $4 \cdot n + 1$ | | | $(1 - j1)$ |
| $4 \cdot n + 2$ | | | $(-1 + j1)$ |
| $4 \cdot n + 3$ | | | $(1 - j1)$ |
| $4 \cdot n + 4 \ldots$ | | | Original |
| $4 \cdot n + 7$ | | | |
| $4 \cdot n + 0$ | 0 | $(-1 - j1)$ | $-(-1 + j1)$ |

TABLE 2-continued

Reference Subcarrier Constellation for Shared Partitions

| Symbol no. (in a block) | Reference Bit | Original Constellation | Modified Constellation |
|---|---|---|---|
| $4 \cdot n + 1$ | | | $-(1 - j1)$ |
| $4 \cdot n + 2$ | | | $-(-1 + j1)$ |
| $4 \cdot n + 3$ | | | $-(1 - j1)$ |
| $4 \cdot n + 4 \ldots$ | | | Original |
| $4 \cdot n + 7$ | | | | where n = {0 ... 6}

As depicted in Table 2, an example deceptive reference pattern which will effectively destroy or hide the reference subcarriers from existing receivers is applied over a sequence of four symbols, starting with a first constellation point (−1+j), then proceeding to a second constellation point (1−j), then proceeding to a third constellation point (−1+j), then proceeding to a fourth constellation point (1−j) before returning to the original constellation point for the remainder of the symbols in the block. If desired, other constellation point patterns may be used. On the broadcasting side, this results in a modified constellation in which four constellation points are applied for the first four symbols along with the transmitted data before reverting to the original constellation point for the remaining symbols, as indicated in Table 2. On the receiver side, this results (under optimal reception conditions) in existing receivers being deceived by the deceptive reference pattern to calculate "zeroed" filtered subcarrier vector values {0±j0} from the first four symbols during the second predetermined time intervals. For the duration of the second predetermined time intervals, the payload subcarriers may employ QPSK modulation or higher modulation level such as 16QAM, in conjunction with applicable power settings for the shared partition/sideband.

3. Shared Subcarriers

In selected content multiplexing embodiments which employ shared subcarriers in a given partition, first and second content portions of the enhanced digital content are simultaneously conveyed by applying modulation changes to both reference subcarriers and the associated payload subcarriers. These modulation changes are applied in a way to enable backwards compatibility so that old or existing receivers can receive the first content portion (e.g., existing content for a first type of receiver), but are prevented from decoding the second content portion (e.g., new content for a second type of receiver) by applying modulation changes to the reference subcarriers and payload subcarriers so that the second content portion is detected as noise or erasure information. When employing shared subcarriers for content multiplexing, the payload subcarriers are simultaneously used to convey both the first and second content portions of the enhanced digital content, in which case the broadcasting system constantly and sequentially provides modified reference subcarriers using a pattern of modulation changes. While any desired modulation sequence for the reference subcarriers may be employed, selected embodiments of the present disclosure have employed the modified constellation shown in Table 3 over the symbol sequence to achieve minimal or unnoticeable demodulation degradation of the first content portion for conveying existing content while optimizing or maximizing destruction of the second content portion for conveying new digital content at the existing receivers.

TABLE 3

Reference Subcarrier Constellation for Shared Subcarriers

| Symbol (sequential no.) | Reference Bit | Original Constellation | Modified Constellation |
|---|---|---|---|
| n | 1 | (1 + j1) | (1 − j1) |
| n + 1 | | | (1 + j1) |
| n + 2 | | | (1 − j1) |
| n + 3 | | | (1 + j0) |
| n + 4 | | | (1 + j1) |
| n | 0 | (−1 − j1) | −(1 − j1) |
| n + 1 | | | −(1 + j1) |
| n + 2 | | | −(1 − j1) |
| n + 3 | | | −(1 + j0) |
| n + 4 | | | −(1 + j1) | where "n" may be arbitrary.

Figure 17:
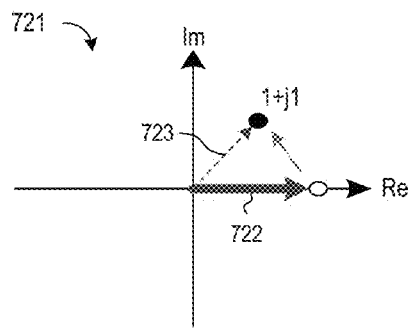
FIG. 17 illustrates a rotated reference phase derived by an existing receiver upon receiving modified reference subcarriers in accordance with selected shared subcarrier embodiments.

As depicted in Table 3, an example modulation sequence may be applied over a sequence of five symbols to establish an alternating reference subcarrier, starting with a first constellation point (1−j), then proceeding to a second constellation point (1+j) (which is also the original constellation point), then to a third constellation point (1−j), then to a fourth constellation point (1+j0), and then to a fifth constellation point (1+j), before returning to the first constellation point. If desired, other constellation point patterns may be used. On the receiver side, the modified constellation of the reference subcarriers results (under optimal reception conditions) in existing receivers deriving a reference phase that is rotated by 45° counter-clockwise, as illustrated in FIG. 17 which illustrates a rotated reference phase signal constellation 721 derived by an existing receiver upon receiving modified reference subcarriers in accordance with Table 3. As indicated with the white circle in the constellation 721, existing receivers which receive unmodified reference subcarriers produce a reference vector 722 having a reference phase at 0° for demodulating the data payload subcarriers. However, as indicated with the black circle in the constellation 721, the modified reference subcarrier constellation causes existing receivers to derive a reference vector 723 with a reference phase at 45°, thus disrupting demodulation of the data payload subcarriers. As a result of the rotated reference value, existing receivers should perceive the alternating reference subcarriers as noisy in one component only (i.e., either I or Q), thus calculating noticeable noise variance estimate for that component. By itself, the excess noise that is caused in existing receivers by the rotated reference phase may be insufficient to affect certain metrics. However, the reference phase rotation also results in received payload subcarriers being aligned with the axis, which then results in nearly zero value for the orthogonal (e.g., I or Q) component. As a result, the combination of a small orthogonal component value and excess noise should lead to noticeably low metrics for one component which can then be used for delivering new digital content.

In order to decode a first content portion from the shared subcarriers, existing receivers may have one arbitrary payload component (either I or Q) that is fully detectable with the other component being hidden or destroyed by the reference phase rotation techniques disclosed herein for modulating the reference and payload subcarriers. However, new receivers (which can decode the second content portion) must know unconditionally (i.e., not relying on steering information, such as a system mode or explicit instruction telling the receiver about the configuration of the broadcast signal) which of the I or Q components is used for the first content portion and which component is used for the second content portion since the delivered data and use of constellations are both random. In order for a new receiver to detect the second content portion, information specifying which component is used for the second content portion must be defined as it is needed very early during demodulation. At the same time, allocating a specific component to each of the first and second content portions requires redefining the bit allocation for each component in a way that is backwards compatible with existing (older) receivers. For purposes of the present disclosure, selected embodiments are described where the I component reserved or allocated for the first content portion which conveys existing or old content, and the Q component is reserved or allocated for the second content portion which conveys new digital content. Of course, it will be appreciated that the allocation of components can also be reversed in accordance with the teachings herein.

Figure 18:
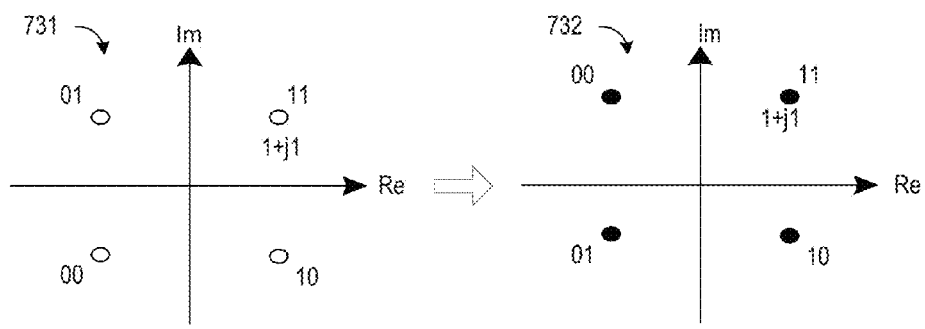
FIG. 18 illustrates QPSK constellations used for broadcast signal payload subcarriers as perceived by existing receivers and by new receivers for shared subcarrier multiplexing in accordance with selected embodiments.

To illustrate selected example embodiments for implementing shared subcarrier multiplexing, reference is now made to FIG. 18 which illustrates QPSK constellations 731, 732 used for broadcast signal payload subcarriers as perceived by existing receivers and by new receivers using the redefined bits allocation for QPSK as described herein for shared subcarrier multiplexing. In particular, the first depicted QPSK constellation 731 is the constellation perceived by existing receivers which may properly detect information from the first content portion (e.g., existing content) on the I component, while perceiving information from the second content portion (e.g., new content) on the Q components as "erasure." The second depicted QPSK constellation 732 illustrates the perceived constellation at new receivers when using the redefined bits allocation for QPSK. With the illustrated allocation 732, new receivers may simultaneously detect information from the first content portion (e.g., existing content) on the component and information from the second content portion (e.g., new content) on the Q component.

Figure 19:
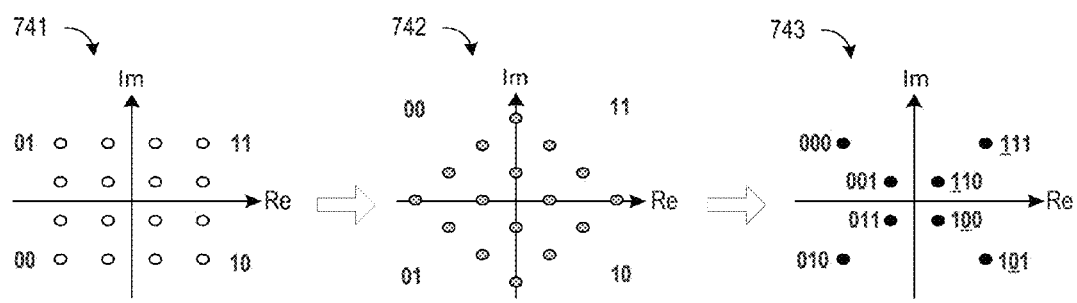
FIG. 19 illustrates rotated and decimated 16QAM constellations used for broadcasting shared signal payload subcarriers in accordance with selected embodiments.

To illustrate how shared subcarrier multiplexing may be implemented with embodiments employing a higher modulation level, such as pi/8-rotated decimated 16QAM modulation for the payload subcarriers, reference is now made to FIG. 19 which illustrates the rotated and decimated 16QAM constellations 741-743 used when broadcasting shared payload subcarriers using the redefined bits allocation described herein for shared subcarrier multiplexing. In the first depicted 16QAM constellation 741, there is shown the 16QAM constellation perceived by existing receivers which may properly detect information from the first content portion (e.g., existing content) on the I component, while perceiving information from the second content portion (e.g., new content) on the Q components as "erasure." The second constellation 742 shows a rotated 16QAM constellation 742 after being rotated by pi/8 radians, while the third constellation 743 illustrates the rotated and decimated 16QAM constellation 742 after being decimated. The rotated and decimated constellation 743 illustrates the perceived constellation at new receivers when using the redefined bits allocation for rotated and decimated 16QAM modulation. With the illustrated allocations 741-743, new receivers may simultaneously detect information from the first content portion (e.g., existing content) on the I component and information from the second content portion (e.g., new content) on the Q component.

In order to deceive existing receivers with the Q component information while correctly conveying new digital content to new receivers, the broadcasting system should employ predetermined bit substitution patterns. As will be appreciated, any desired pattern may be chosen, though no pattern will likely achieve both objectives of deceiving existing receivers while correctly conveying new digital content to new receivers. Indeed, it may not be numerically possible to achieve both new channel's bit placement wholly on the Real (I) signaling axis or wholly on the Imaginary (Q) signaling axis while also accounting for old receivers to properly perceive the remaining bit on the remaining signaling. However, there is at least one bit selection pattern set forth below in Table 4 which substantially achieves both objectives (deceiving existing receivers while correctly conveying new digital content to new receivers) such that there is only one exception.

TABLE 4

Constellation Transitions and Receiver Perception

| Original Bits | | Original Constellation | New Bit | New Constellation mapping | Old Receiver Perceived Constellation | Old Receiver Perceived Bits | | New Receiver Perceived Bits | |
|---|---|---|---|---|---|---|---|---|---|
| I | Q | mapping | | | | I | Q | I | Q |
| +0 | 0 | (−1 − j1) | 0 | (−1 + j1) | (0 − j1) | E | 0 | 0+ | 0 |
| +0 | 0 | (−1 − j1) | 1 | (−1 − j1) | (−1 − j0) | 0 | E | 0 | 1 |
| +0 | 1 | (−1 + j1) | 0 | (−1 + j1) | (0 − j1) | E | 1 | 0 | 0 |
| +0 | 1 | (−1 + j1) | 1 | (−1 − j1) | (−1 − j0) | 0 | E | 0 | 1 |
| +1 | 0 | (1 − j1) | 0 | (1 − j1) | (0 − j1) | E | 0 | 1 | 0 |
| +1 | 0 | (1 − j1) | 1 | (1 + j1) | (1 − j0) | 1 | E | 1 | 1 |
| ?1 | 1 | (1 + j1) | 0 | (1 + j1) | (1 + j0) | 1 | E | 1 | ?1 |
| +1 | 1 | (1 + j1) | 1 | (1 + j1) | (0 + j1) | E | 1 | 1+ | 1 |

TABLE 5

| Erroneous Occurrences in Shared Partitions | | |
|---|---|---|
| Old Receiver Perceived old Bit | New Receiver Perceived old Bit | New Receiver Perceived new Bit |
| correct | correct | incorrect |
| correct | Incorrect | correct |
| incorrect | correct | correct |

Depending on the content multiplexing embodiment employed, the bit rates and encoding rates may be affected.

As depicted in Table 4, broadcasting the original component bit values for I and Q (Original Bits) using the original constellation mappings, such as the QPSK constellations 731 or 16QAM constellation 741, would result in the identified perceived payload constellations at the old or existing receivers (Old Receiver Perceived Constellation). However, broadcasting the redefined bits allocation pattern to include the indicated New Bit value results in a New Payload Constellation mapping. In the depicted allocation, old or existing receivers may properly detect or perceive information from the first content portion (e.g., existing content) on the I component while perceiving information from the second content portion (e.g., new digital content) on the Q components as "erasure." In addition, new receivers may simultaneously detect information from the first content portion (e.g., existing content) on the I component and information from the second content portion (e.g., new digital content) on the Q component.

In Table 4, the chosen modified numerical value association along with the bit replacement pattern results in only one such conflict out of eight possible transitions. Examples for such conflicts are labeled by '?' (Question mark). That conflict can result in only one of the conflicting cases and erroneous combinations listed in Table 5. The broadcasting system can choose the specific erroneous case so as to always affect the same specific bit. Such error may reduce the code rate efficiency for that specific case (either the whole new specific bit stream or the remaining part of the old bit stream) by a ratio of 7/8. Otherwise, the broadcasting system may apply periodic rotation between the three conflicting cases, thus distributing or spreading the error. By spreading the error, the potential reduction of the coding rate efficiency is by a ratio of as little as 23/24.

For example, the use of shared subcarriers or shared partitions allows for choosing nearly any desired ratio for allocating resources to the first and second content portions. From an implementation standpoint, continuous sharing which equally splits raw (physical) resources between old and new content may be considered the simplest since it requires no special configuration signaling. In addition, continuous sharing of partitions or subcarriers allows for a limited and useful increase in throughput. However, the use of shared partitions may have advantage over shared subcarriers since higher modulation levels can be used during the time intervals allocated for new content without residual (one only) error in a pattern. Such higher modulation levels allows for further increase in throughput, but has to be considered in conjunction with potential power adjustment for matching the coverage capabilities of new content and old content. In contrast, the use of separate partitions for content multiplexing allows nearly any desired coding rate to be chosen for the new content, while trading throughput increase vs. robustness. The use of separate partitions also allows either QPSK or 16QAM to be employed for the new content, as well as allowing the possibility of power adjustments to partitions that carry new content independently of partitions that carry old content.

Figure 20:
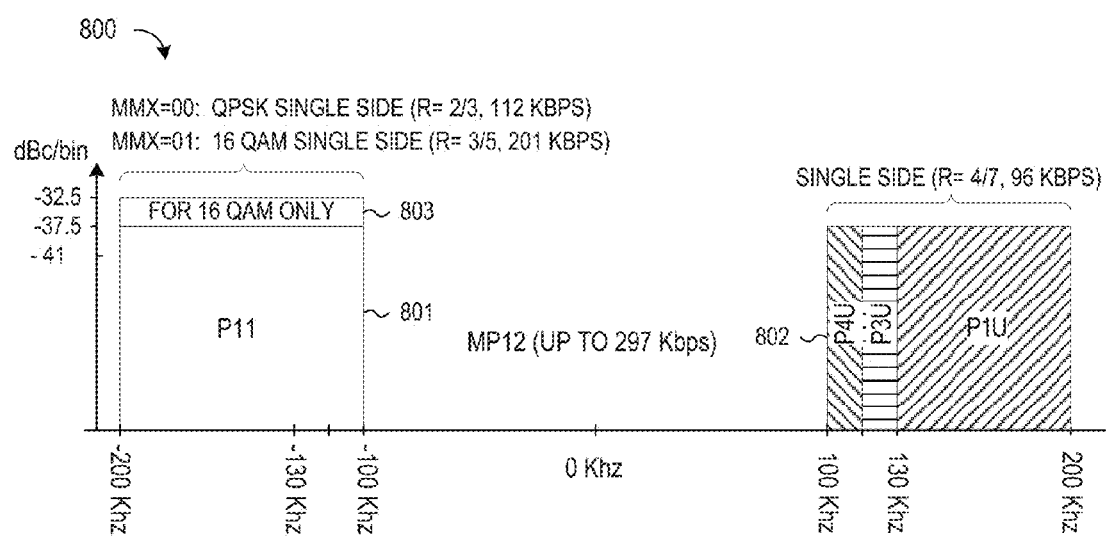
FIG. 20 illustrates a double sideband configuration for broadcasting new services on digital radio payload subcarriers of a designated digital sideband by using a modified reference subcarrier signal constellation to increase throughput to an IBOC digital radio receiver in accordance with first selected embodiments.

To further explain and describe selected embodiments of the system and method for increasing system throughput, there are now disclosed new system modes for using separate partitions to broadcast modulated digital content that may be received by new IBOC digital radio receivers and ignored by existing IBOC digital radio receives. Referring first to FIG. 20, there is illustrated a first system mode 800 which uses separate partitions 801, 802 to increase throughput to an IBOC digital radio receiver by providing signal content multiplexing. The first partition 801 is used to provide new digital content to new IBOC digital radio receivers, while the second, separate partition 802 is used to provide old or default content to existing receivers which ignore the new digital content in the first partition 801. Through the use of the second partition 802, the first system mode 800 is backwards compatible with conventional IBOC digital radio broadcast systems (described above with reference to FIG. 13). In particular, the second partition 802 is a single sideband that may be broadcast at higher power (dBc/bin=−37.5) to improve robustness in the reception and decoding of upper bands P1U, P3U, P4U and that may benefit from time diversity to carry 96 Kbps of net throughput with an overall coding rate of 4/7. In addition, the first opposed partition 801 (shown as the lower band in the first system mode 800) is independent of the second sideband 802, and employs reference signaling and data signaling that deceives existing (older) receivers into perceiving the first partition 801 as being noise that can be disregarded or erased. In contrast to the lower sideband (P1L/P3L/P4L) in the conventional IBOC digital radio broadcast systems shown in FIG. 13, the new partition/sideband 801 spans a bandwidth of 100 kHz which is wholly associated with a single newly defined logical channel P11 in which the encoded bits may be spread to provide time diversity, along with interleaving options.

In the depicted first system mode 800, the modulation level for the first opposed partition 801 is indicated by 2-bit multiplexing information MMX, which may be included in the control sequence by making use of two specified or reserved bits. At multiplexing level MMX=00, QPSK modulation is employed for the first opposed partition 801 to provide a coding rate of 2/3, resulting in a throughput of approximately 112 Kbps. However, by increasing the sideband power of the first opposed partition 801 by approximately 3.5 dB (e.g., from the original MP1 power setting of −41 dB to −37.5 dB), coverage may be achieved similar to that of the conventional IBOC digital radio broadcast systems. And at multiplexing level MMX=01, 16QAM modulation may be employed with coding rate of approximately 3/5, resulting in a throughput of approximately 201 Kbps. As indicated by the first partition extension 803, the sideband power at multiplexing level MMX=01 may be increased by approximately 8.5 dB (e.g., from the original MP1 power setting of −41 dB to −32.5 dB) to achieve coverage similar to that of the conventional IBOC digital radio broadcast systems. Between the first and second separate partitions 801-803, the first system mode 800 can provide a total system throughput of up to 297 Kbps.

As disclosed herein, the first system mode 800 can be used in hybrid deployments and/or in all-digital deployments. And upon becoming recognized and processed by most receivers, the first system mode 800 allows for future transitions to abandon older system modes and transition to future dual sideband-higher throughput modes. In addition, the first system mode 800 provides a single logical channel (e.g., P11) that may be used for new or additional throughput, regardless of potential bandwidth scaling of that sideband. It is noted that bandwidth scaling may be employed to increase the throughput without affecting performance.

As will be appreciated, the digital radio broadcast system, transmitter, and receiver apparatus for increasing system throughput to deliver enhanced digital content to a second set of receivers using a modified reference constellation pattern to map selected reference subcarriers to be perceived as noise by a first set of receivers disclosed herein may be embodied in hardware, processing circuitry, software (including but not limited to firmware, resident software, microcode, etc.), or in some combination thereof, including a computer program product accessible from a computer-usable or computer-readable medium providing program code, executable instructions, and/or data for use by or in connection with a computer or any instruction execution system, where a computer-usable or computer readable medium can be any apparatus that may include or store the program for use by or in connection with the instruction execution system, apparatus, or device. Examples of a non-transitory computer-readable medium include a semiconductor or solid state memory, magnetic tape, memory card, a removable computer diskette, a random access memory (RAM), a read-only memory (ROM), a rigid magnetic disk and an optical disk, such as a compact disk-read only memory (CD-ROM), compact disk-read/write (CD-R/W) and DVD, or any other suitable memory.

By now it should be appreciated that there is provided herein a digital radio broadcast system for managing digital signal throughput of an in-band on-channel (IBOC) digital radio broadcast signal and associated processor-implemented method of operation. In selected embodiments, a digital radio broadcast receiver includes at least one recordable storage medium having stored thereon executable instructions and data which, when executed by at least one processing device, cause the at least one processing device to control the reception of a digital radio broadcast signal (e.g., an over-the-air in-band on-channel HD Radio broadcast signal) which includes a first payload subcarrier group for conveying first content under control of an associated first plurality of reference subcarriers digitally modulated with a first signal constellation, and a second payload subcarrier group for conveying second content under control of an associated second plurality of reference subcarriers digitally modulated with a second signal constellation. At the digital radio broadcast receiver, the digital radio broadcast signal is processed to produce a first coherent reference signal estimate for the first plurality of reference subcarriers to extract the first content from the first payload subcarrier group for playback and to produce a second coherent reference signal estimate for the second plurality of reference subcarriers to disregard the second content. In other embodiments, the digital radio broadcast signal is processed at the digital radio broadcast receiver to produce a first coherent reference signal estimate for the first plurality of reference subcarriers to extract the first content from the first payload subcarrier group for playback and to produce a second coherent reference signal estimate for the second plurality of reference subcarriers to extract the second content from the second payload subcarrier group for playback. In selected embodiments, the received digital radio broadcast signal is an FM digital radio broadcasting signal having first and second sidebands, where the first sideband includes the first payload subcarrier group and the associated first plurality of reference subcarriers in a first sideband, and where the second sideband includes the second payload subcarrier group and the associated second plurality of reference subcarriers. The first sideband may include a first partition for transmitting the first content as default digital content to a first receiver, and the second sideband may include a second, separate partition for transmitting the second content as enhanced digital content to a second receiver such that the first receiver perceives the second content as noise. In such embodiments, the second signal constellation may include at least four rotating constellation points which are sequentially applied at the transmitter to modulate the associated second plurality of reference subcarriers. In other embodiments, the first sideband and second sideband may be time multiplexed for transmission on a shared partition comprising a plurality of subcarriers, in which case the second signal constellation may include a deceptive reference pattern of up to four constellation points which are sequentially applied at the transmitter to modulate the associated second plurality of reference subcarriers before reverting to the first signal constellation. In other embodiments, the first sideband and second sideband may be multiplexed for transmission on shared subcarriers by modulating "I" components of shared payload subcarriers with the first content and simultaneously modulating "Q" components of shared payload subcarriers with the second content, in which case the signal constellation of the reference subcarriers for the second content may include a plurality of alternating constellation points which are sequentially applied at the transmitter to modulate the reference subcarriers to cause the first receiver to derive a reference phase that is rotated by 45°. In selected receivers, the digital radio broadcast signal may be processed to produce the first coherent reference signal estimate by extracting reference subcarrier symbols transmitted on the first plurality of reference subcarriers; combining the reference subcarrier symbols with a known reference sequence conjugate corresponding to the first signal constellation to produce a plurality of samples; median filtering the plurality of samples to produce filtered samples; and smoothing the filtered samples over the first plurality of reference subcarriers to produce the first coherent reference signal estimate for the first plurality of reference subcarriers to extract the first content from the first payload subcarrier group. In other receivers, the digital radio broadcast signal may be processed to produce the second coherent reference signal estimate by extracting reference subcarrier symbols transmitted on the second plurality of reference subcarriers; combining the reference subcarrier symbols with a known reference sequence conjugate corresponding to the first signal constellation to produce a plurality of samples; median filtering the plurality of samples to produce filtered samples; and smoothing the filtered samples over the second plurality of reference subcarriers to produce the second coherent reference signal estimate for the second plurality of reference subcarriers to disregard the second content from the second payload subcarrier group. In response to the second coherent reference signal estimate, the digital radio broadcast receiver may produce erasure information for the second content. In addition, the digital radio broadcast signal may be processed at a second receiver to produce a third coherent reference signal estimate for the second plurality of reference subcarriers to extract the second content from the second payload subcarrier group for playback at the second receiver.

In other embodiments, there is provided a transmitter having a modulator, processor circuitry, and amplifier. The modulator is operative to digitally modulate a first plurality of reference subcarriers with a first signal constellation, and to digitally modulate a second plurality of reference subcarriers with a second signal constellation. The processor circuitry is provided to generate the digital radio broadcast signal by combining the first plurality of reference subcarriers with a first data payload subcarrier group for conveying first content under control of the first plurality of reference subcarriers, and by combining the second plurality of reference subcarriers with a second data payload subcarrier group for conveying second content under control of the second plurality of reference subcarriers. The amplifier is provided for amplifying the digital radio broadcast signal for broadcast to a first receiver for processing to produce a first coherent reference signal estimate for the first plurality of reference subcarriers to extract the first content from the first data payload subcarrier group for playback and to produce a second coherent reference signal estimate for the second plurality of reference subcarriers to disregard the second content from the second data payload subcarrier group.

In other embodiments, there is provided a digital radio broadcast transmitter comprising at least one recordable storage medium having stored thereon executable instructions and data which, when executed by at least one processing device, cause the at least one processing device to broadcast a digital radio broadcast signal. To broadcast the digital radio broadcast signal, the instructions and data are executed to modulate a first plurality of reference subcarriers and a second plurality of reference subcarriers with a first signal constellation and a second signal constellation, respectively. In addition, the instructions and data are executed to combine the first plurality of reference subcarriers with a first data payload subcarrier group for conveying first content under control of the first plurality of reference subcarriers. The instructions and data are also executed to combine the second plurality of reference subcarriers with a second data payload subcarrier group for conveying second content under control of the second plurality of reference subcarriers. Finally, the instructions and data are executed to process the digital radio broadcast signal for broadcast to a first receiver for processing to produce a first coherent reference signal estimate for the first plurality of reference subcarriers to extract the first content from the first data payload subcarrier group for playback and to produce a second coherent reference signal estimate for the second plurality of reference subcarriers to disregard the second content from the second data payload subcarrier group.

Although the described exemplary embodiments disclosed herein are directed to an exemplary IBOC system for managing digital signal throughput of an in-band on-channel (IBOC) digital radio broadcast signal by employing signal multiplexing to deliver new content to new receivers in a way that is hidden from old receivers, the present invention is not necessarily limited to the example embodiments which illustrate inventive aspects of the present invention that are applicable to a wide variety of digital radio broadcast receiver designs and/or operations. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A method for processing a digital radio broadcast signal, the method comprising:
   receiving a digital radio broadcast signal comprising:
      a first payload subcarrier group for conveying first content under control of an associated first plurality of reference subcarriers digitally modulated with a first signal constellation, and
      a second payload subcarrier group for conveying second content under control of an associated second plurality of reference subcarriers digitally modulated with a second signal constellation; and
   processing the digital radio broadcast signal at a first receiver to produce a first coherent reference signal estimate for the first plurality of reference subcarriers to extract the first content from the first payload subcarrier group for playback and to produce a second coherent reference signal estimate for the second plurality of reference subcarriers to disregard the second content.

2. The method of claim 1, where receiving the digital radio broadcast signal comprises receiving an over-the-air in-band on-channel digital radio broadcast signal.

3. The method of claim 1, where receiving the digital radio broadcast signal comprises receiving an FM digital audio broadcasting signal comprising a first sideband and a second sideband, where the first sideband comprises the first payload subcarrier group and the associated first plurality of reference subcarriers in the first sideband, and where the second sideband comprises the second payload subcarrier group and the associated second plurality of reference subcarriers.

4. The method of claim 3, where the first sideband comprises a first partition for transmitting the first content as default digital content to a first receiver, and where the second sideband comprises a second, separate partition for transmitting the second content as enhanced digital content to a second receiver such that the first receiver perceives the second content as noise.

5. The method of claim 4, where the second signal constellation comprises at least four rotating constellation points which are sequentially applied to modulate the associated second plurality of reference subcarriers.

6. The method of claim 3, where the first sideband and second sideband are time multiplexed for transmission on a shared partition comprising a plurality of subcarriers.

7. The method of claim 6, where the second signal constellation comprises a deceptive reference pattern of up to four constellation points which are sequentially applied to modulate the associated second plurality of reference subcarriers before reverting to the first signal constellation.

8. The method of claim 3, where the first sideband and second sideband are multiplexed for transmission on shared subcarriers by modulating "I" components of shared reference subcarriers with the first signal constellation and simultaneously modulating "Q" components of shared reference subcarriers with the second signal constellation.

9. The method of claim 8, where the second signal constellation comprises a plurality of alternating constellation points which are sequentially applied to modulate the "Q" components of shared reference subcarriers to cause the first receiver to derive a reference phase that is rotated by 45°.

10. The method of claim 1, where processing the digital radio broadcast signal to produce the first coherent reference signal estimate comprises:
   extracting reference subcarrier symbols transmitted on the first plurality of reference subcarriers;
   combining the reference subcarrier symbols with a known reference sequence conjugate corresponding to the first signal constellation to produce a plurality of samples;
   median filtering the plurality of samples to produce filtered samples; and
   smoothing the filtered samples over the first plurality of reference subcarriers to produce the first coherent reference signal estimate for the first plurality of reference subcarriers to extract the first content from the first payload subcarrier group.

11. The method of claim 1, where processing the digital radio broadcast signal to produce the second coherent reference signal estimate comprises:
   extracting reference subcarrier symbols transmitted on the second plurality of reference subcarriers;
   combining the reference subcarrier symbols with a known reference sequence conjugate corresponding to the first signal constellation to produce a plurality of samples;
   median filtering the plurality of samples to produce filtered samples; and
   smoothing the filtered samples over the second plurality of reference subcarriers to produce the second coherent reference signal estimate for the second plurality of reference subcarriers to disregard the second content from the second payload subcarrier group.

12. The method of claim 11, further comprising producing erasure information for the second content in response to the second coherent reference signal estimate.

13. The method of claim 1, further comprising processing the digital radio broadcast signal at a second receiver to produce a third coherent reference signal estimate for the second plurality of reference subcarriers to extract the second content from the second payload subcarrier group for playback at the second receiver.

14. A digital radio broadcast receiver comprising at least one recordable device having stored thereon executable instructions and data which, when executed by at least one processing device, cause the at least one processing device to process a digital radio broadcast signal by:
   receiving a digital radio broadcast signal comprising:
      a first payload subcarrier group for conveying first content under control of an associated first plurality of reference subcarriers digitally modulated with a first signal constellation, and
      a second payload subcarrier group for conveying second content under control of an associated second plurality of reference subcarriers digitally modulated with a second signal constellation; and
   processing the digital radio broadcast signal to produce a first coherent reference signal estimate for the first plurality of reference subcarriers to extract the first content from the first payload subcarrier group for playback and to produce a second coherent reference signal estimate for the second plurality of reference subcarriers to disregard the second content.

15. The digital radio broadcast receiver of claim 14, wherein the executable instructions and data, when executed by at least one processing device, cause the at least one processing device to receive the digital radio broadcast signal by receiving an over-the-air in-band on-channel digital radio broadcast signal.

16. The digital radio broadcast receiver of claim 14, wherein the executable instructions and data, when executed by at least one processing device, cause the at least one processing device to receive the digital radio broadcast signal by receiving an FM digital audio broadcasting signal comprising a first sideband and a second sideband, where the first sideband comprises the first payload subcarrier group and the associated first plurality of reference subcarriers in the first sideband, and where the second sideband comprises the second payload subcarrier group and the associated second plurality of reference subcarriers.

17. The digital radio broadcast receiver of claim 16, where the first sideband comprises a first partition for conveying the first content as default digital content, and where the second sideband comprises a second, separate partition for conveying the second content as enhanced digital content such that the digital radio broadcast receiver perceives the second content as noise.

18. The digital radio broadcast receiver of claim 17, where the second signal constellation comprises at least four rotating constellation points which are sequentially applied to modulate the associated second plurality of reference subcarriers.

19. The digital radio broadcast receiver of claim 16, where the first sideband and second sideband are time multiplexed for transmission on a shared partition comprising a plurality of subcarriers.

20. The digital radio broadcast receiver of claim 19, where the second signal constellation comprises a deceptive reference pattern of up to four constellation points which are sequentially applied to modulate the associated second plurality of reference subcarriers before reverting to the first signal constellation.

21. The digital radio broadcast receiver of claim 16, where the first sideband and second sideband are multiplexed for transmission on shared subcarriers by modulating "I" components of shared payload subcarriers with the first content and simultaneously modulating "Q" components of shared payload subcarriers with the second content.

22. The digital radio broadcast receiver of claim 21, where the second reference subcarrier signal constellation comprises a plurality of alternating constellation points which are sequentially applied to modulate the second plurality of reference subcarriers to cause the digital radio broadcast receiver to derive a reference phase that is rotated by 45°.

23. The digital radio broadcast receiver of claim 14, wherein the executable instructions and data, when executed by at least one processing device, cause the at least one processing device to process the digital radio broadcast signal to produce a first coherent reference signal estimate by:
    extracting reference subcarrier symbols transmitted on the first plurality of reference subcarriers;
    combining the reference subcarrier symbols with a known reference sequence conjugate corresponding to the first signal constellation to produce a plurality of samples;
    median filtering the plurality of samples to produce filtered samples; and
    smoothing the filtered samples over the first plurality of reference subcarriers to produce the first coherent reference signal estimate for the first plurality of reference subcarriers to extract the first content from the first payload subcarrier group.

24. The digital radio broadcast receiver of claim 14, wherein the executable instructions and data, when executed by at least one processing device, cause the at least one processing device to process the digital radio broadcast signal to produce a second coherent reference signal estimate by:
    extracting reference subcarrier symbols transmitted on the second plurality of reference subcarriers;
    combining the reference subcarrier symbols with a known reference sequence conjugate corresponding to the first signal constellation to produce a plurality of samples;
    median filtering the plurality of samples to produce filtered samples; and
    smoothing the filtered samples over the second plurality of reference subcarriers to produce the second coherent reference signal estimate for the second plurality of reference subcarriers to disregard the second content from the second payload subcarrier group.

25. The digital radio broadcast receiver of claim 24, wherein the executable instructions and data, when executed by at least one processing device, cause the at least one processing device to produce erasure information for the second content in response to the second coherent reference signal estimate.

26. An article of manufacture comprising a non-transitory computer readable storage device having computer program instructions adapted to cause a processing system to:
    control reception of an over-the-air in-band on-channel digital radio broadcast signal comprising:
        a first payload subcarrier group for conveying first content under control of an associated first plurality of reference subcarriers digitally modulated with a first signal constellation, and
        a second payload subcarrier group for conveying second content under control of an associated second plurality of reference subcarriers digitally modulated with a second signal constellation;
    process the over-the-air in-band on-channel digital radio broadcast signal at a first receiver to produce a first coherent reference signal estimate for the first plurality of reference subcarriers to extract the first content from the first payload subcarrier group for playback and to produce a second coherent reference signal estimate for the second plurality of reference subcarriers to disregard the second content; and
    produce erasure information for the second content in response to the second coherent reference signal estimate.

27. A digital radio broadcast receiver comprising at least one recordable device having stored thereon executable instructions and data which, when executed by at least one processing device, cause the at least one processing device to process a digital radio broadcast signal by:
    receiving a digital radio broadcast signal comprising:
        a first payload subcarrier group for conveying first content under control of an associated first plurality of reference subcarriers digitally modulated with a first signal constellation, and
        a second payload subcarrier group for conveying second content under control of an associated second plurality of reference subcarriers digitally modulated with a second signal constellation; and
    processing the digital radio broadcast signal to produce a first coherent reference signal estimate for the first plurality of reference subcarriers to extract the first content from the first payload subcarrier group for playback and to produce a second coherent reference signal estimate for the second plurality of reference subcarriers to extract the second content from the second payload subcarrier group for playback.

28. A transmitter, comprising:
    a modulator for digitally modulating a first plurality of reference subcarriers with a first signal constellation, and for digitally modulating a second plurality of reference subcarriers with a second signal constellation;
    processor circuitry for generating the digital radio broadcast signal by combining the first plurality of reference subcarriers with a first data payload subcarrier group for conveying first content under control of the first plurality of reference subcarriers, and by combining the second plurality of reference subcarriers with a second data payload subcarrier group for conveying second content under control of the second plurality of reference subcarriers; and
    an amplifier for amplifying the digital radio broadcast signal for broadcast to a first receiver for processing to produce a first coherent reference signal estimate for the first plurality of reference subcarriers to extract the first content from the first data payload subcarrier group for playback and to produce a second coherent reference signal estimate for the second plurality of reference subcarriers to disregard the second content from the second data payload subcarrier group.

29. A digital radio broadcast transmitter comprising at least one recordable device having stored thereon executable instructions and data which, when executed by at least one processing device, cause the at least one processing device to broadcast a digital radio broadcast signal by:

modulating a first plurality of reference subcarriers and a second plurality of reference subcarriers with a first signal constellation and a second signal constellation, respectively;

combining the first plurality of reference subcarriers with a first data payload subcarrier group for conveying first content under control of the first plurality of reference subcarriers;

combining the second plurality of reference subcarriers with a second data payload subcarrier group for conveying second content under control of the second plurality of reference subcarriers; and processing the digital radio broadcast signal for broadcast to a first receiver for processing to produce a first coherent reference signal estimate for the first plurality of reference subcarriers to extract the first content from the first data payload subcarrier group for playback and to produce a second coherent reference signal estimate for the second plurality of reference subcarriers to disregard the second content from the second data payload subcarrier group.

* * * * *